United States Patent
Hasegawa et al.

(10) Patent No.: US 8,094,343 B2
(45) Date of Patent: Jan. 10, 2012

(54) IMAGE PROCESSOR

(75) Inventors: Tomohiko Hasegawa, Nagoya (JP); Masaki Kondo, Toyoake (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 565 days.

(21) Appl. No.: 12/202,971

(22) Filed: Sep. 2, 2008

(65) Prior Publication Data
US 2009/0059263 A1 Mar. 5, 2009

(30) Foreign Application Priority Data

Aug. 31, 2007 (JP) ................................. 2007-226587
Aug. 31, 2007 (JP) ................................. 2007-226588

(51) Int. Cl.
H04N 1/40 (2006.01)
(52) U.S. Cl. ...................................... 358/3.24; 358/527
(58) Field of Classification Search .................... 358/1.9, 358/2.1, 468, 3.24, 3.26, 527, 400, 500, 406, 358/504
See application file for complete search history.

(56) References Cited

U.S. PATENT DOCUMENTS

| | | | |
|---|---|---|---|
| 5,210,600 A | 5/1993 | Hirata | |
| 5,459,589 A | 10/1995 | Ohnishi et al. | |
| 5,539,426 A * | 7/1996 | Nishikawa et al. | 345/635 |
| 5,734,802 A | 3/1998 | Maltz et al. | |
| 5,764,380 A | 6/1998 | Noguchi | |
| 5,805,308 A | 9/1998 | Tanaka et al. | |
| 5,940,530 A | 8/1999 | Fukushima et al. | |
| 6,072,914 A | 6/2000 | Mikuni | |
| 6,333,752 B1 * | 12/2001 | Hasegawa et al. | 715/764 |
| 6,646,760 B1 | 11/2003 | Hanihara | |
| 6,757,427 B1 | 6/2004 | Hongu | |
| 6,801,334 B1 | 10/2004 | Enomoto | |
| 6,922,261 B2 | 7/2005 | Asano | |
| 7,145,597 B1 | 12/2006 | Kinjo | |

(Continued)

FOREIGN PATENT DOCUMENTS

EP 1 648 158 A1 4/2006

(Continued)

OTHER PUBLICATIONS

Web-page from SITEMAKER Website, together with English translation, May 11, 2007, http://www.n1-sitemaker.com/cgi-bin/nextone/sitemaker.cgi?mode=page&page=page2&category=4.

(Continued)

*Primary Examiner* — Thomas D Lee
*Assistant Examiner* — Stephen M Brinich
(74) *Attorney, Agent, or Firm* — Scully, Scott, Murphy & Presser, PC

(57) ABSTRACT

An image forming processor includes a generating unit and a correcting unit. The first characteristic quantity data obtaining unit obtains a set of first characteristic quantity data. The receiving unit receives data of an original image. The second characteristic data obtaining unit obtains a set of second characteristic quantity data based on the data of the original image. The generating unit generates at least one set of image data concerning the first characteristic quantity data. The display unit displays the at least one set of image data to prompt a user to specify one set of image data among the at least one set of image data. The correcting unit corrects the original image by using the set of second characteristic quantity data and a set of first characteristic quantity data that has been used to generate the one set of image data specified by the user.

25 Claims, 19 Drawing Sheets

U.S. PATENT DOCUMENTS

| | | | |
|---|---|---|---|
| 7,215,792 | B2 | 5/2007 | Sharma et al. |
| 7,283,247 | B2 | 10/2007 | Okawa et al. |
| 7,308,155 | B2 | 12/2007 | Terada |
| 7,349,119 | B2 | 3/2008 | Tsukioka |
| 7,508,550 | B2 | 3/2009 | Kameyama |
| 7,729,013 | B2 | 6/2010 | Nishida |
| 7,903,307 | B2 | 3/2011 | Dai et al. |
| 2002/0060796 | A1 | 5/2002 | Kanno et al. |
| 2003/0031375 | A1 | 2/2003 | Enomoto |
| 2003/0091229 | A1 | 5/2003 | Edge et al. |
| 2003/0128379 | A1 | 7/2003 | Inoue |
| 2003/0193582 | A1 | 10/2003 | Kinjo |
| 2004/0212808 | A1 | 10/2004 | Okawa et al. |
| 2005/0152613 | A1 | 7/2005 | Okutsu |
| 2005/0220347 | A1 | 10/2005 | Enomoto et al. |
| 2006/0001928 | A1 | 1/2006 | Hayaishi |
| 2006/0140477 | A1 | 6/2006 | Kurumisawa et al. |
| 2006/0187477 | A1 | 8/2006 | Maki et al. |
| 2006/0238827 | A1 | 10/2006 | Ikeda |
| 2006/0256410 | A1 | 11/2006 | Koie et al. |
| 2006/0257041 | A1 | 11/2006 | Kameyama et al. |
| 2006/0291017 | A1 | 12/2006 | Moran et al. |
| 2007/0019260 | A1 | 1/2007 | Tokie |
| 2007/0070436 | A1 | 3/2007 | Iwaki |
| 2007/0080973 | A1 | 4/2007 | Stauder et al. |
| 2007/0177029 | A1 | 8/2007 | Wada et al. |
| 2007/0206206 | A1 | 9/2007 | Kondo et al. |
| 2007/0292038 | A1 | 12/2007 | Takemoto |
| 2008/0239410 | A1 | 10/2008 | Hashii et al. |
| 2009/0128871 | A1 | 5/2009 | Patton et al. |
| 2009/0244564 | A1 | 10/2009 | Kondo et al. |
| 2010/0033745 | A1 | 2/2010 | Dai et al. |

FOREIGN PATENT DOCUMENTS

| | | |
|---|---|---|
| JP | H05-119752 | 5/1993 |
| JP | H05-300531 | 11/1993 |
| JP | 5-342344 A | 12/1993 |
| JP | 6-133329 | 5/1994 |
| JP | 7-177366 A | 7/1995 |
| JP | 7-312720 A | 11/1995 |
| JP | H09-116740 | 5/1997 |
| JP | H09-172553 | 6/1997 |
| JP | H09-284583 | 10/1997 |
| JP | 9-325536 | 12/1997 |
| JP | 10-173947 | 6/1998 |
| JP | H10-149441 | 6/1998 |
| JP | H11-098374 | 4/1999 |
| JP | H11-185034 | 7/1999 |
| JP | H11-196258 | 7/1999 |
| JP | 2000-106623 | 4/2000 |
| JP | 2000-152268 | 5/2000 |
| JP | 2000-196904 A | 7/2000 |
| JP | 2001-051062 | 2/2001 |
| JP | 2001-061062 | 3/2001 |
| JP | 2001-160908 | 6/2001 |
| JP | 2002-171408 | 6/2002 |
| JP | 2003-108987 | 4/2003 |
| JP | 2003-187215 | 7/2003 |
| JP | 2003-296723 | 10/2003 |
| JP | 2004-007370 | 1/2004 |
| JP | 2004-054751 | 2/2004 |
| JP | 2004-343365 | 12/2004 |
| JP | 2004-350212 | 12/2004 |
| JP | 2005-182143 A | 7/2005 |
| JP | 2005-192158 | 7/2005 |
| JP | 2005-197996 | 7/2005 |
| JP | 2005-202469 | 7/2005 |
| JP | 2005-242535 | 9/2005 |
| JP | 2005-309651 | 11/2005 |
| JP | 2006-80746 | 3/2006 |
| JP | 2006-121695 | 5/2006 |
| JP | 2006-229537 | 8/2006 |
| JP | 2006-229811 A | 8/2006 |
| JP | 2006-303899 | 11/2006 |
| JP | 2007-89179 | 4/2007 |
| JP | 2007-208413 | 8/2007 |
| WO | WO 2006/036027 A1 | 4/2006 |

OTHER PUBLICATIONS

Web-page from Hiroshima Prefecture Website, together with English translation, Mar. 31, 2005, http://www.work2.pref.hiroshima.jp/soho/a/a08/a08061.html.

Japanese Official Action dated Aug. 25, 2009 with English translation.

Web-page from a personal website, namely 'kappa teki denou kukkan', together with English translation, Apr. 12, 2001, http://kapp.cool.ne.jp/howto/cg/comic6.htm.

Manual for EPSON COLORIO PM-D770, together with English translation, Oct. 7, 2004.

Manual for CANOSCAN 8400F, together with English translation, Jul. 18, 2004.

Japanese Official Action dated Sep. 8, 2009 with English translation.

United States Office Action dated Jul. 25, 2011 in related U.S. Appl. No. 12/194,680.

Japanese Official Action dated Jun. 7, 2011 together with an English language translation from JP 2007-226584 in related U.S. Appl. No. 12/202,872, filed Sep. 2, 2008.

Japanese Official Action dated Jun. 7, 2011 together with an English language translation from JP 2007-226586 in related U.S. Appl. No. 12/202,872, filed Sep. 2, 2008.

U.S. Official Action dated Apr. 18, 2011 from related U.S. Appl. No. 12/202,872.

U.S. Official Action dated Apr. 19, 2011 from related U.S. Appl. No. 12/200,472.

U.S. Official Action dated May 18, 2011 from related U.S. Appl. No. 12/202,986.

Japanese Office Action issued in Patent Application No. JP 2007-226090 on Apr. 12, 2011 together with English language translation.

Official Action dated May 31, 2011 from the Japanese Patent Office from related Japanese Application No. JP 2007-226091 and U.S. Appl. No. 12/194,680, together with a partial English-language translation.

U.S. Official Action dated Oct. 20, 2011 from related U.S. Appl. No. 12/202,885.

U.S. Final Official Action dated Sep. 29, 2011 from related U.S. Appl. No. 12/200,472.

U.S. Final Official Action dated Oct. 14, 2011 from related U.S. Appl. No. 12/202,872.

Office Action dated Aug. 9, 2011 received from the Japanese Patent Office from related Japanese Application No. 2007-226088 and U.S. Appl. No. 12/202,872, together with an English-language translation.

United States Office Action dated Oct. 25, 2011 received in related U.S. Appl. No. 12/202,986.

\* cited by examiner

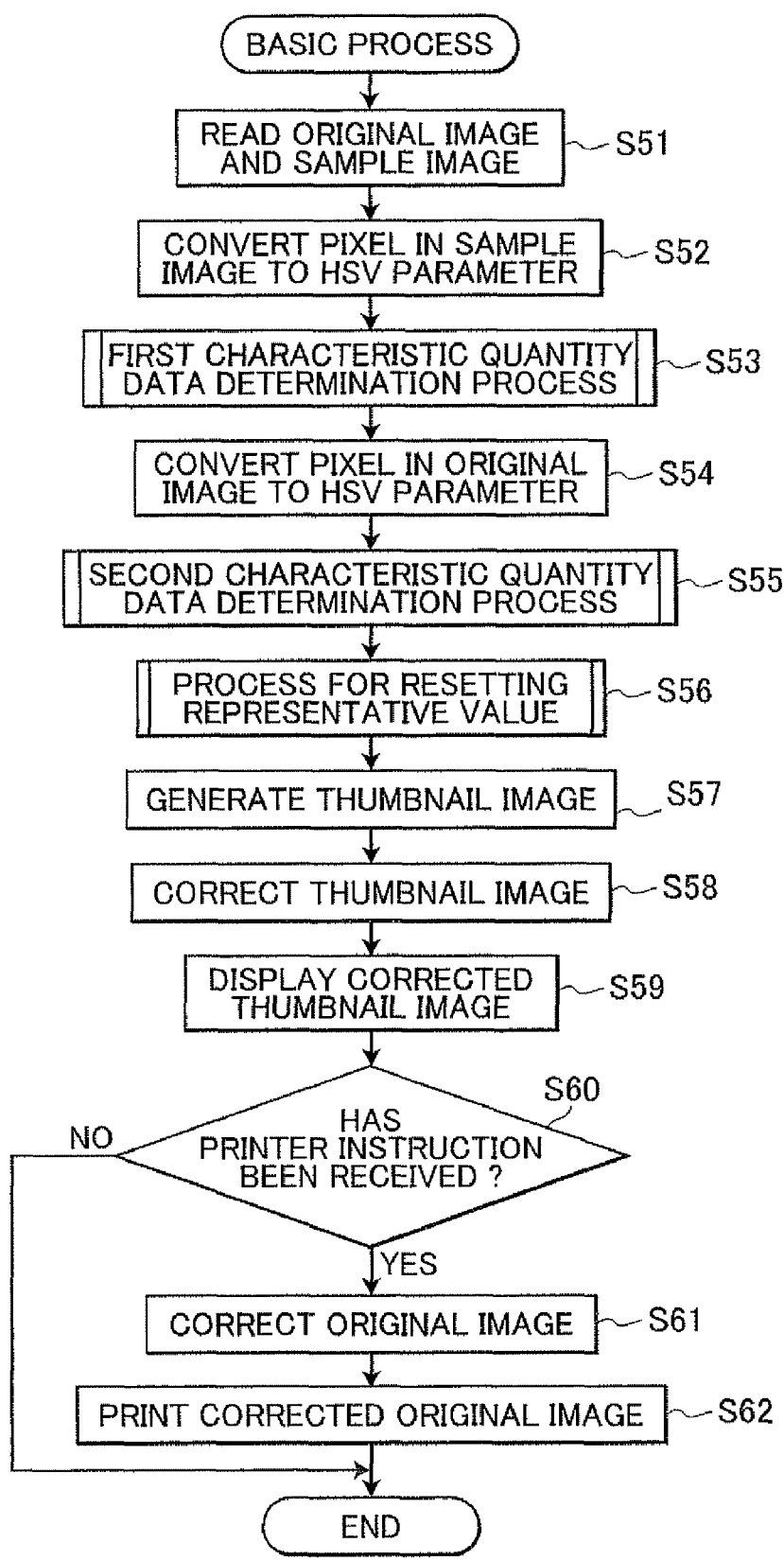

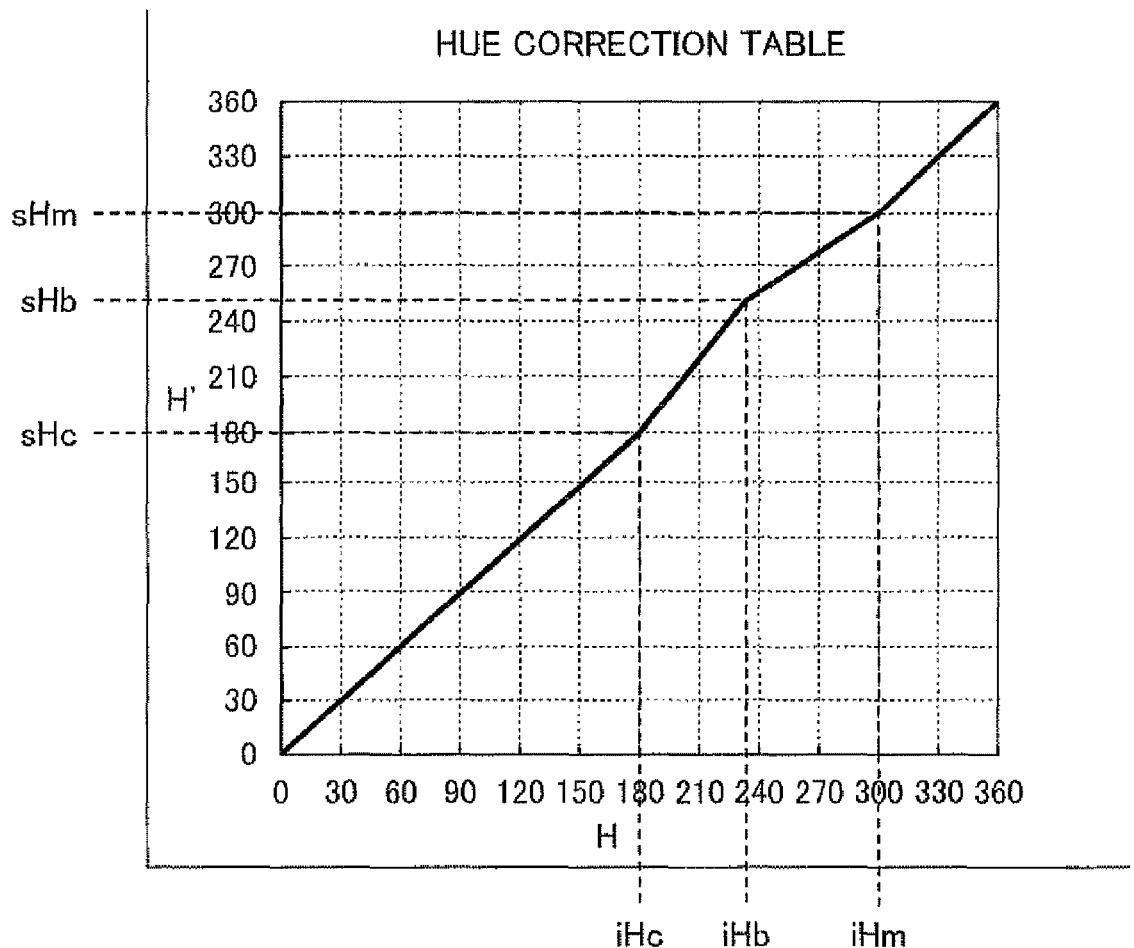

COLOR HUE-REGION 1    COLOR HUE-REGION 2

:TARGET PIXEL

:REFERENCE PIXEL

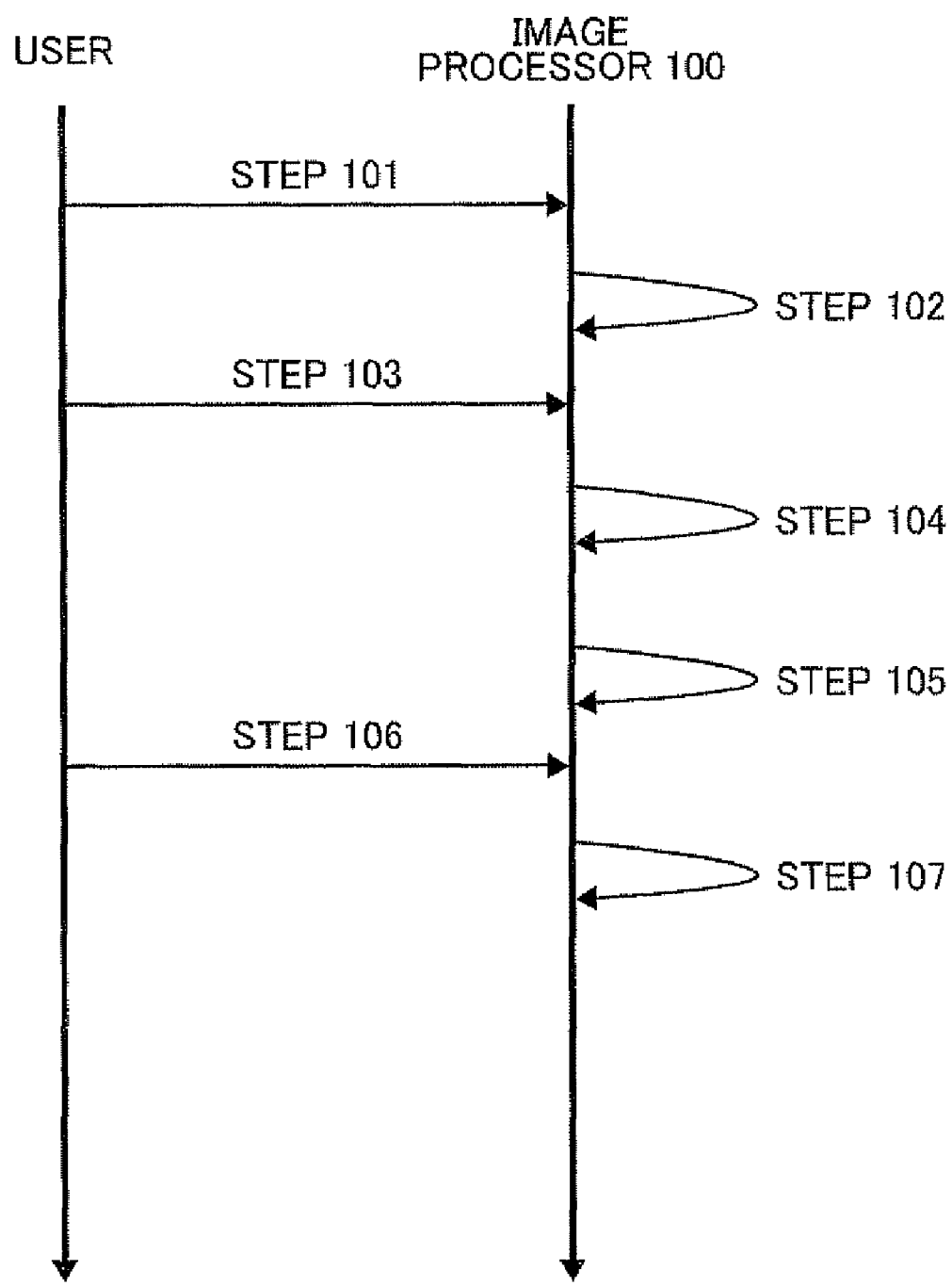

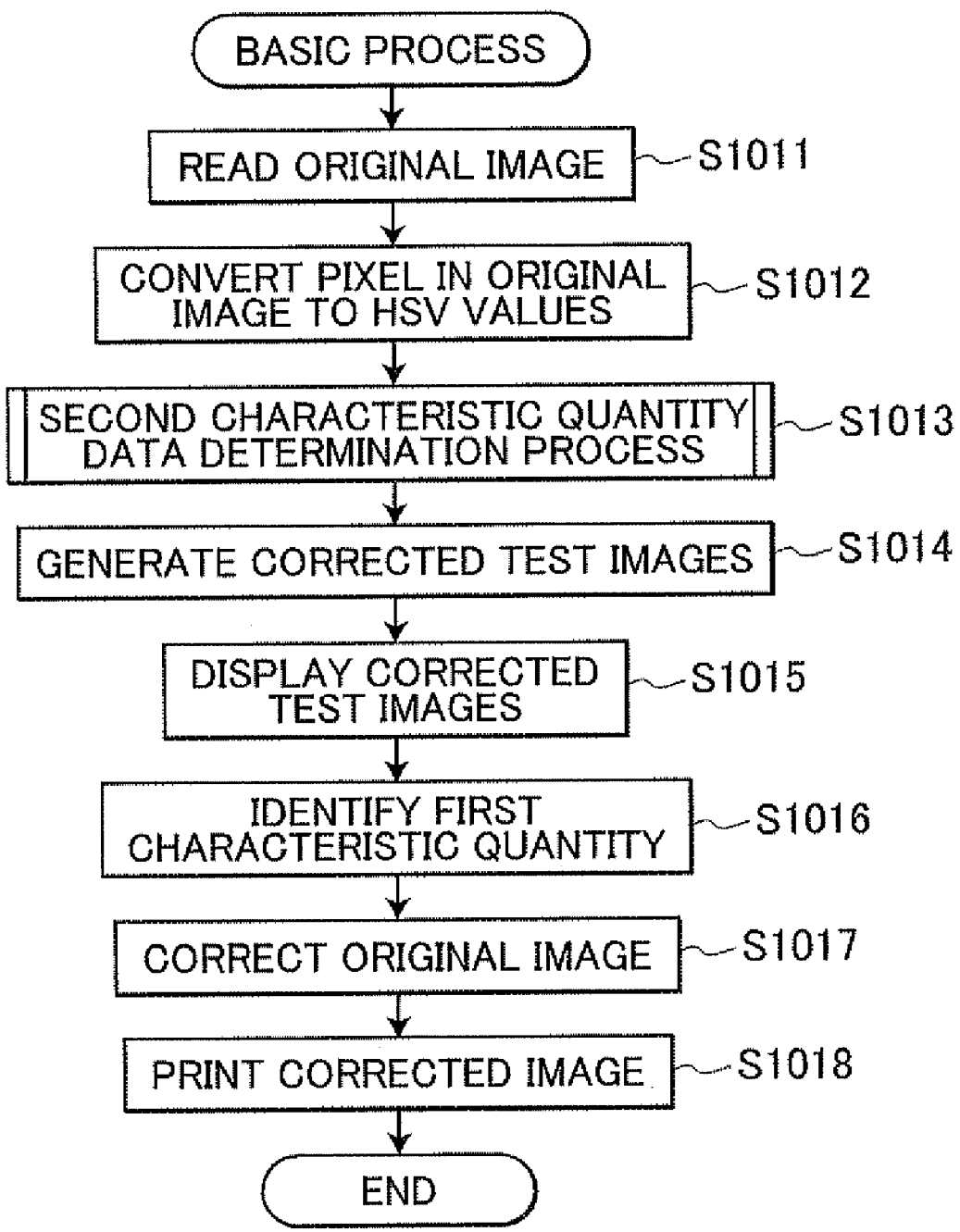

IMAGE PROCESSOR

CROSS REFERENCE TO RELATED APPLICATION

This application claims priorities from Japanese Patent Applications No. 2007-226587 filed Aug. 31, 2007, and No. 2007-226588 filed Aug. 31, 2007. The entire contents of the priority applications are incorporated herein by reference.

TECHNICAL FIELD

The present invention relates to an image processor and a method of image processing for performing image correction through simple operations.

BACKGROUND

As digital cameras and the like have become popular, it has become commonplace for users to print images they themselves have taken on a home printer, and to print (duplicate) images stored in a printing medium on a home printer. If the acquired images do not have the desired colors or tones in such cases, it is preferable to perform image correction on the images prior to printing.

Japanese unexamined patent application publication No. 2007-89179, for example, discloses a printing device capable of calibrating an image. This printing device requires the input of calibration data for calibrating the quality of an acquired image.

SUMMARY

Since specific data must be inputted for calibrating images with the printing device described above, the user must have technical knowledge of the image; in other words, the user cannot perform sensory color adjustments (adjustments made based on the user's instincts or visual impression). Further, the user must select and specify calibration data in the above printing device, requiring more complex operations. Further, it is difficult to predict what type of image correction will be performed at stages prior to printing or prior to image correction.

In view of the foregoing, it is an object of the present invention to provide an image processor enabling a user to confirm what type of image correction will be performed and to perform desired image correction instinctively.

In order to attain the above and other objects, the invention provides an image processor. The image processor includes a first receiving unit, a second receiving unit, a thumbnail generating unit, a first characteristic quantity data determining unit, a second characteristic quantity data determining unit, a correcting unit, a display unit, and a printing process executing unit. The first receiving unit receives a first image. The second receiving unit receives a second image. The thumbnail generating unit generates a thumbnail image based on the second image. The first characteristic quantity data determining unit determines a set of first characteristic quantity data based on the first image. The second characteristic quantity data determining unit determines a set of second characteristic quantity based on one of the second image and the thumbnail image. The correcting unit corrects the thumbnail image and the second image by using the set of first characteristic quantity data and the set of second characteristic quantity data. The display unit displays the corrected thumbnail image to prompt a user to input his/her instruction to print the corrected second image. The printing process executing unit executes, upon receipt of the user's instruction, a process for recording the corrected second image on a recording medium.

According to another aspects, the invention provides an image processor. The image processor includes a first receiving unit, a second receiving unit, a thumbnail generating unit, a first characteristic quantity data determining unit, a second characteristic quantity data determining unit, a correcting unit, and a display unit. The first receiving unit receives a first image. The second receiving unit receives a second image. The thumbnail generating unit generates a thumbnail image based on the second image. The first characteristic quantity data determining unit determines a set of first characteristic quantity data based on the first image. The second characteristic quantity data determining unit determines a set of second characteristic quantity data based on one of the second image and the thumbnail image. The correcting unit corrects the thumbnail image by using the set of first characteristic quantity data and the set of second characteristic quantity data. The display unit displays the corrected thumbnail image to prompt a user to input his/her instruction to correct the second image. Upon receipt of the user's instruction, the correcting unit corrects the second image by using the set of first characteristic quantity data and the set of second characteristic quantity data.

According to still another aspects, the invention provides an image processor. The image processor includes a first characteristic quantity data storing unit, a receiving unit, a determining unit, a generating unit, a display unit, and a correcting unit. The first characteristic quantity data storing unit stores at least one set of first characteristic quantity data. The receiving unit receives data of an original image. The determining unit determines a set of second characteristic quantity data based on the data of the original image. The generating unit generates at least one set of display data indicative of at least one image based on the at least one set of first characteristic quantity data. The display unit displays the at least one set of display data to prompt a user to specify one set of the at least one set of display data. The correcting unit corrects the original image by using the set of second characteristic quantity data and one set of first characteristic quantity data that has been used to generate the one set of display data specified by the user.

BRIEF DESCRIPTION OF THE DRAWINGS

Embodiments in accordance with the invention will be described in detail with reference to the following figures wherein:

FIG. 8 is a flowchart illustrating steps in a basic process according to a first modification of the first embodiment;

FIG. 10 is a graph for a hue correction table according to the first modification of the first embodiment;

FIG. 22 is an explanatory diagram showing an overview of user operations and resulting processing on the image processor;

FIG. 23 is a flowchart illustrating steps in a basic process according to the second embodiment;

DETAILED DESCRIPTION

Next, embodiments of the invention will be described while referring to the accompanying drawings.

First Embodiment

Figure 1:
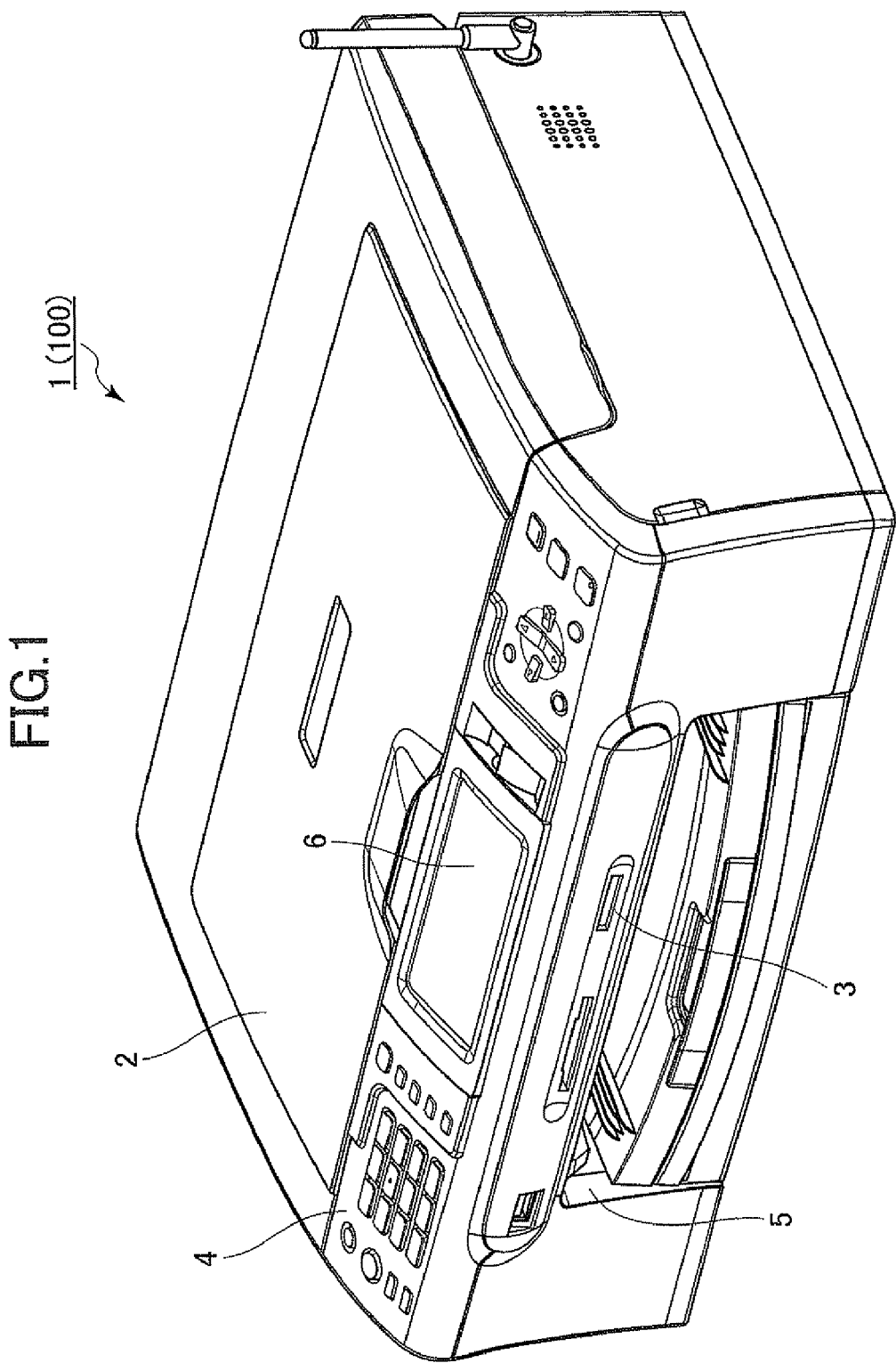
FIG. 1 is a perspective view showing the external appearance of an image processor.
Figure 2:
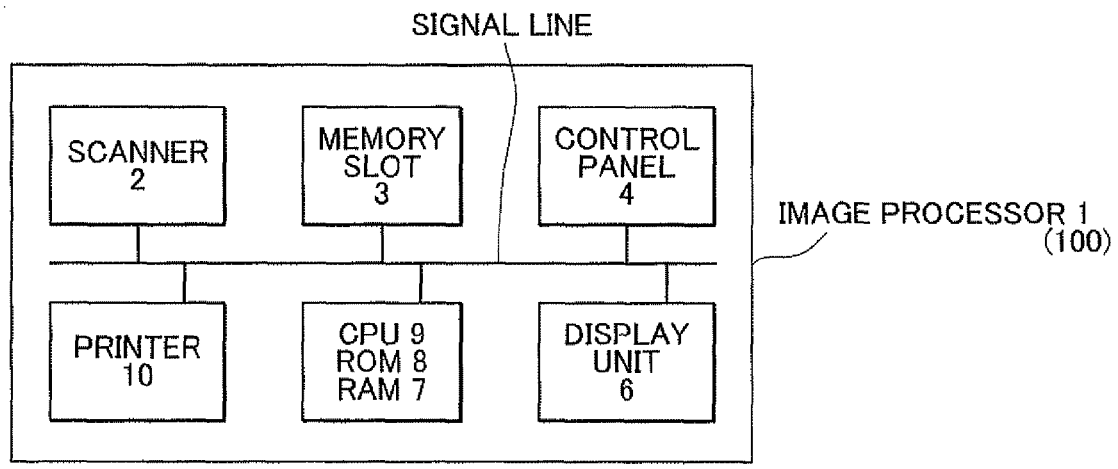
FIG. 2 is a block diagram illustrating the internal structure of the image processor.

FIG. 1 shows an example exterior of an image processor 1 according to a first embodiment of the invention. FIG. 2 shows an example internal structure of the image processor 1.

The image processor 1 according to the first embodiment is a multifunction printer having a scanner 2 for reading image data from a photograph or the like placed thereon. The scanner 2 in FIG. 1 is in a covered state. Image data read by the scanner 2 is used as sample data for correcting hues and the like in image data read from a memory slot described later. This process of image correction will be described in detail below.

The image processor 1 has a memory slot 3 functioning as an IC card reader for reading image data stored in external memory. The external memory is a storage medium, such as an SD Card (registered trademark) or a CompactFlash Card (registered trademark). Here, a desirable medium and format well known in the art may be used as the external memory. Alternatively, the memory slot 3 may be configured of a plurality of memory slots supporting a plurality of media types. By adding, to the signal line that is connected to the CPU, ROM, and RAM shown in FIG. 2, a communication function (a LAN card, for example; not shown) that is capable of connecting the image processor 1 to a LAN or other network which is also connected to a personal computer (PC) storing image data, the image processor 1 may be configured to read desired image data from the PC connected to the network instead of from the external memory.

The image processor 1 also has a control panel 4 enabling the user to perform various operations. The control panel 4 includes various buttons.

As shown in FIG. 2, the image processor 1 also has a printer 10. The printer 10 prints image data on paper or the like after the data has undergone image correction. After images are printed on the paper, the paper is discharged through a discharge opening 5, for example.

The image processor 1 also has a display unit 6 for displaying various text and images. A transparent touch panel may be provided over the surface of the display unit 6 for implementing part or all of the functions of the control panel 4. The image processor 1 may also combine the touch panel and the control panel 4.

The image processor 1 is further provided with a central processing unit (CPU) 9 for controlling overall operations of the image processor 1, a RAM 7 for temporarily storing data, a ROM 8 storing prescribed data, and, when necessary, a hard disk drive or other large-capacity storage device (not shown).

All of the components described above are interconnected via a signal line.

Other functions, such as a facsimile function, may also be added to the image processor 1, as well as an interface for connecting the image processor 1 to a personal computer or the like and an interface for connecting the image processor 1 to another printing device.

It should be apparent that the exterior of the image processor 1 described above is merely an example, and the present invention is not limited to such an exterior. Further, while all functions described above are integrally provided in a single device in the drawings, some of these functions may be implemented in an external device. It should also be apparent that the internal structure of the image processor 1 described above is merely an example, and the invention is not limited to this internal structure.

Figure 3:
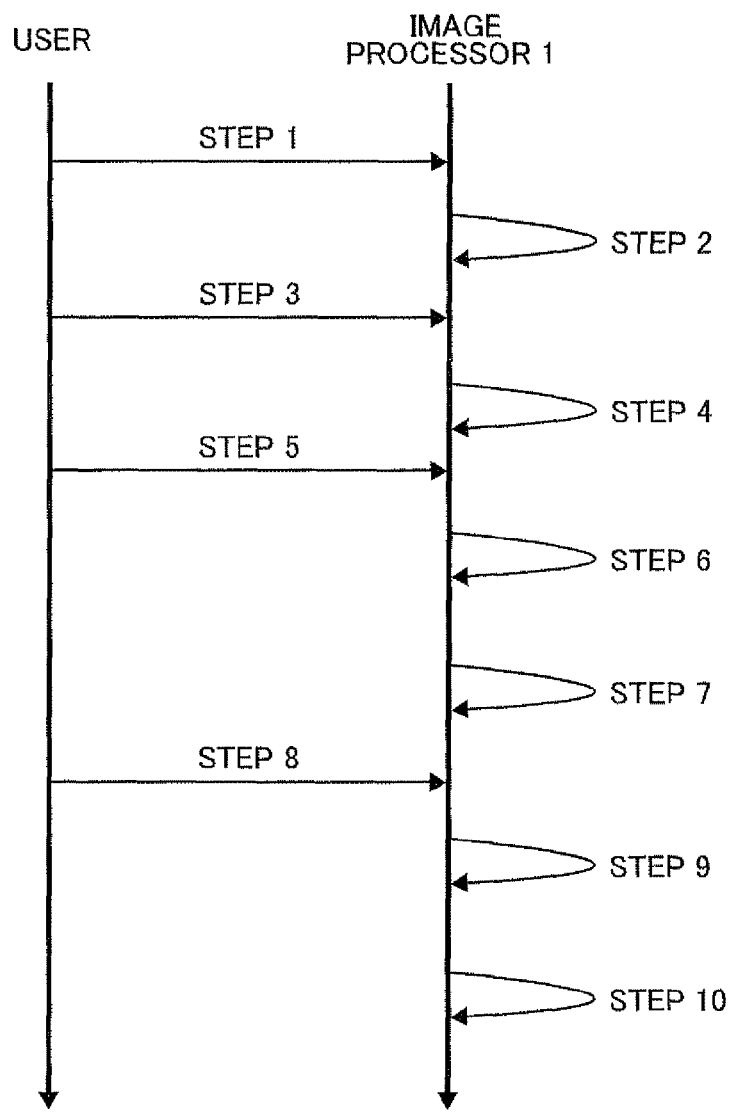
FIG. 3 is an explanatory diagram showing an overview of user operations and resulting processing on the image processor.

Next, a main process performed on the image processor 1, including an overview of user operations and the resulting processes performed by the image processor 1, will be described. FIG. 3 shows an overview of this process. As shown in FIG. 3, the user first inserts a storage medium in the memory slot 3 of the image processor 1 (step 1). As described above, this memory is configured of a memory card or other storage medium well known in the art and stores images that are candidates for image correction.

After the user has inserted a memory card into the memory slot 3, the image processor 1 recognizes this memory card and prompts the user to select an image to be corrected from among the images stored in this memory (step 2). Any suitable technique known in the art may be used for selecting an image, such as a method of sequentially scrolling and selecting the desired image. The user may also use the touch panel on the display unit 6 to select an image at this time.

After the user has specified an image to be corrected (step 3), the image processor 1 reads this image from memory and writes the image data to RAM 7, for example (step 4). Hereafter, this image will be referred to as the "original image."

Next, the user places an image to be used as a sample for image correction (hereinafter referred to as the "sample image") on the scanner (step 5) and presses a prescribed button or the like. In response, the image processor 1 writes the sample image to the RAM 7, for example (step 6).

Next, the image processor 1 generates and displays a thumbnail image (step 7). The process for generating a thumbnail image will be described later.

At this time, the user confirms that the thumbnail image has undergone his/her desired image correction and performs an operation to initiate a printing operation using the control panel 4 or the touch panel (step 8).

Upon receiving the print instruction, the image processor 1 executes the image correction process on the original image (step 9) and subsequently prints the corrected original image (step 10).

In the process described above with reference to FIG. 3, the image processor 1 reads the sample image using the scanner after reading the original image from the memory, but the image processor 1 may be configured to read the original image from the memory after first reading the sample image with the scanner.

Figure 4:
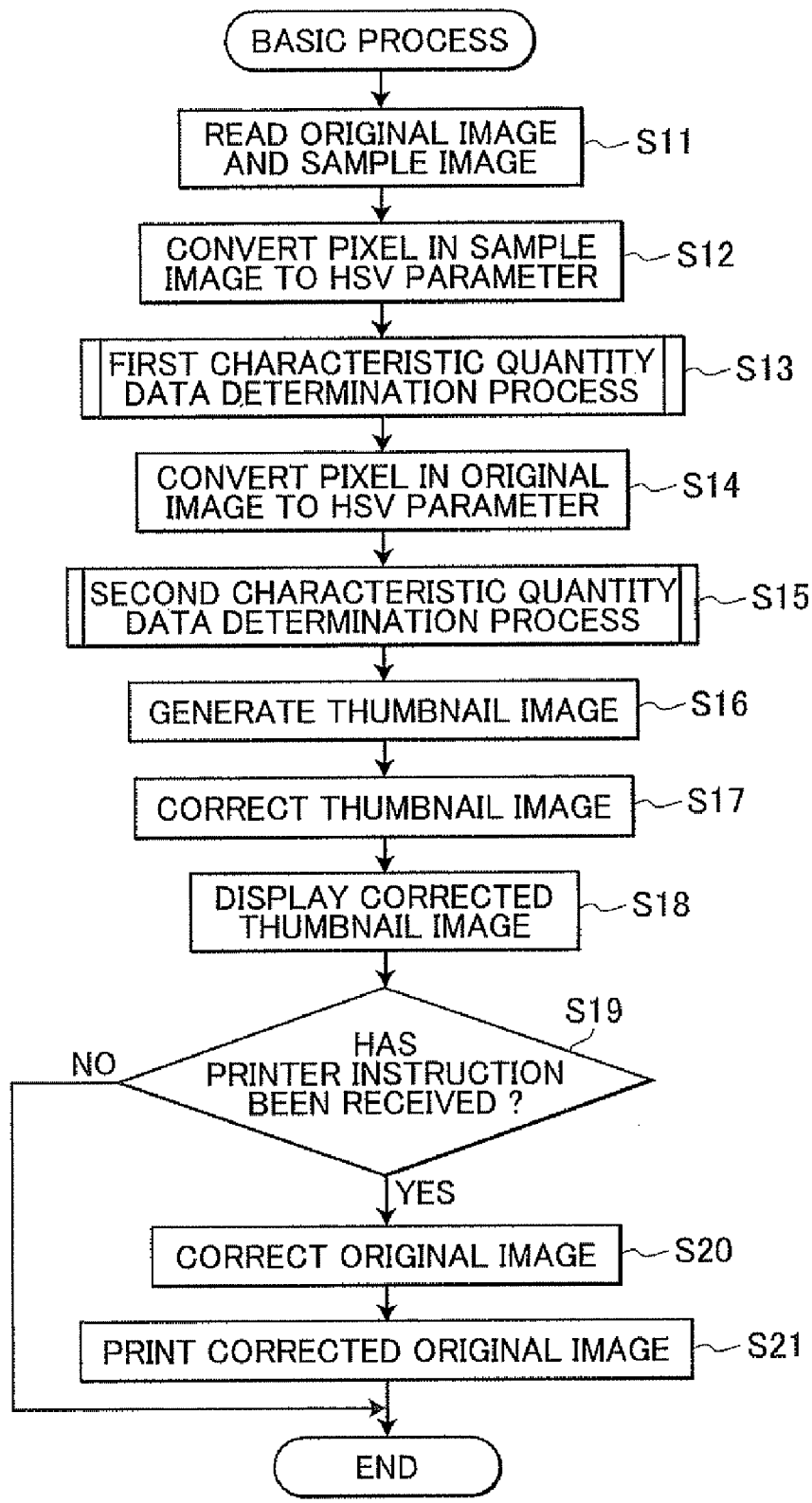
FIG. 4 is a flowchart illustrating steps in a basic process according to the first embodiment.

Next, the basic process performed on the image processor 1 will be described with reference to FIG. 4. FIG. 4 is a flowchart illustrating steps in the basic process according to the first embodiment.

In S11 of the basic process, the CPU 9 of the image processor 1 reads an original image and a sample image into the RAM 7 of the image processor 1. Here, there is no particular restriction on the format of the image read in S11.

In S12 the CPU 9 converts each pixel of the sample image into a set of HSV parameters. This process for converting pixels to HSV parameters will also be described later.

In S13 the CPU 9 determines a set of first characteristic quantity data based on the set of HSV parameters obtained in S12. The determination of the set of first characteristic quantity data will be described later in detail.

In S14 the CPU 9 converts each pixel of the original image into a set of HSV parameters. In S15 the CPU 9 determines a set of second characteristic quantity data based on the set of HSV parameters obtained in S14.

In S16 the CPU 9 generates a thumbnail image by converting the original image to a resolution of a prescribed size. Here, the prescribed size is set such that the entire thumbnail image can be displayed on the display unit 6. The process of S16 need not be executed when using the original image itself as the thumbnail image. The resolution of the image may be converted using the nearest-neighbor algorithm, bilinear or bicubic interpolation, and, for reduction only, the average pixel technique, but the invention is not limited to these methods.

In S17 the CPU 9 corrects the thumbnail image using the set of first characteristic quantity data and the set of second characteristic quantity data. This correction process will be described later in greater detail. At this time, the HSV parameters are converted to other parameters, such as RGB parameters, as needed. The process for converting HSV parameters to RGB parameters will be described later.

In S18 the CPU 9 displays the corrected thumbnail image on the display unit 6. Further, a message is displayed on the display unit 6 together with the thumbnail image for prompting the user to indicate whether or not to print the thumbnail image. According to this display, the user inputs an instruction to print or to quit through operations on the touch panel of the display unit 6, for example.

In S19 the CPU 9 determines whether a print instruction has been received based on the user operation. If a print instruction has been not received (S19: NO), the CPU 9 ends the current basic process. However, if a print instruction has been received (S19: YES), the CPU 9 advances to S20.

In S20 the CPU 9 corrects colors in the original image based on the set of first characteristic quantity data and the set of second characteristic quantity data. The process for correcting the original image will be described later in detail. At this time, the HSV parameters are converted to other parameters, such as RGB parameters, as needed. The process for converting HSV parameters to RGB parameters will be described later.

In S21 the CPU 9 prints the corrected original image. The process in S20 described above may also be performed in advance before confirming whether a print instruction has been received. Specifically, the CPU 9 may perform color conversion on both of the original image and the thumbnail image and store the results of this conversion in the RAM 7. When the user inputs a print instruction, the CPU 9 prints the converted original image stored in the RAM 7. However, performing the process in S20 after receiving a printing instruction reduces the processing load on the image processor 1.

Although the set of second characteristic quantity data is extracted from the original image after extracting the set of first characteristic quantity data from the original image in the process described above, the set of first characteristic quantity data may be determined after determining the set of second characteristic quantity data. Further, the CPU 9 may extract L*c*h* parameters rather than HSV parameters. The CPU 9 may extract RGB or other parameters well known in the art rather than HSV parameters. The following description assumes that HSV parameters are extracted.

Next, the process for converting pixels to HSV parameters in S12 and S14 of FIG. 4 will be described. When the original image and the sample image is acquired as RGB parameters, the RGB parameters for each pixel may be converted to HSV parameters according to the following equations. However, the following conversion equation is merely an example, and the image processor 1 may perform conversion according to another method.

Method of RGB→HSV Conversion

First, the value "V" is calculated by the following formula:

$$V = \max(R \div 255, G \div 255, B \div 255),$$

wherein max(a, b, c) denotes the largest value among a, b, and c.

Based on the determined value "V", the value "S" is calculated by the following formulas:

when V is 0, $S = 0$; and when V is not 0, $S = \{V - \min(R \div 255, G \div 255, B \div 255)\} \div V,$ wherein min(a, b, c) denotes the smallest value among a, b, and c.

Based on the value "V", the value "r", "g", and "b" are determined by the following formulas:

when $\{V - \min(R \div 255, G \div 255, B \div 255)\}$ is not 0, $$r=(V-R\div 255)\div(V-\min(R\div 255, G\div 255, B\div 255)),$$

$$g=(V-G\div 255)\div(V-\min(R\div 255, G\div 255, B\div 255)),$$

$$b=(V-B\div 255)\div(V\div\min(R\div 255, G\div 255, B\div 255)); \text{ and}$$

when {V−min(R÷255, G÷255, B÷255)} is 0,
r=0,
g=0,
b=0.

Based on the values "r", "g", and "b", the value "H" is calculated by the following formulas:

$$\text{when } V=R\div 255, H=60\times(b-g);$$

$$\text{when } V=G\div 255, H=60\times(2+r-g); \text{ and}$$

$$\text{when } V=B\div 255, H=60\times(4+g-r).$$

Figure 5:
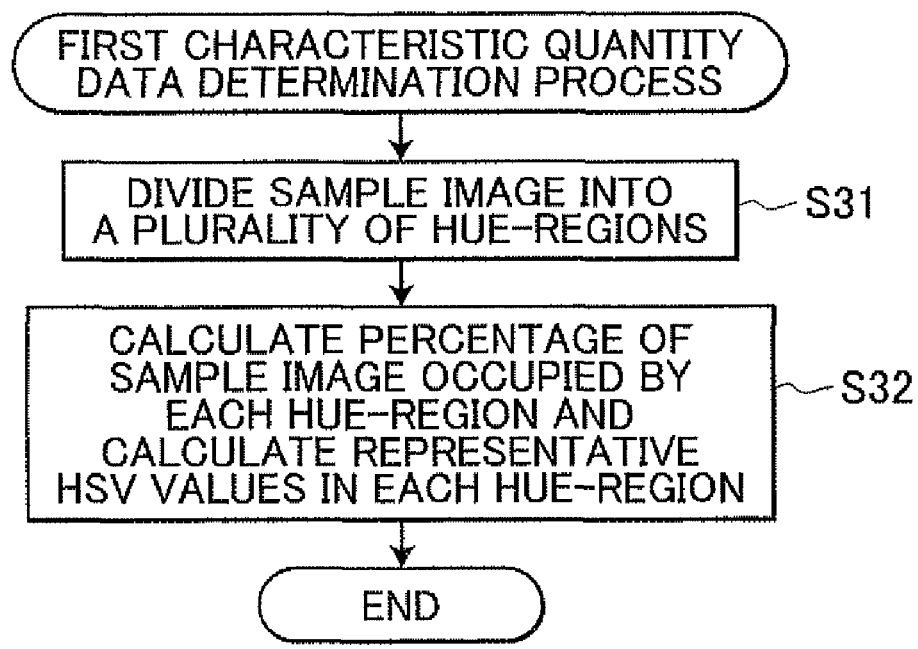
FIG. 5 is a flowchart illustrating steps in a set of first characteristic quantity data determination process.

Next, the first characteristic data determination process of S13 in FIG. 4 for extracting the set of first characteristic quantity data from the sample image will be described with reference to FIG. 5. FIG. 5 is a flowchart illustrating steps in the first characteristic quantity data determination process. In the following process, it will be assumed that H takes on a value of at least −30 and less than 330. When H does not fall within this range, H is adjusted to a value within the range according to a suitable conversion, such as H=H+360×n or H=H−360×n, where n is an integer.

In S31 of the first characteristic quantity data determination process, the CPU 9 divides the sample image into a plurality of hue-regions (six commonly used hue regions in this example). Specifically, each of the pixels in the sample image is allocated into either one of the following six hue-regions based on its H value:
R hue-region: grater than or equal to −30 and less than 30
Y hue-region: grater than or equal to 30 and less than 90
G hue-region: grater than or equal to 90 and less than 150
C hue-region: grater than or equal to 150 and less than 210
B hue-region: grater than or equal to 210 and less than 270
M hue-region: grater than or equal to 270 and less than 330
Hence, the CPU 9 performs a process to sort all the pixels of the sample image into six classifications based on the above classification criteria for the hue value. The correspondence between each hue-region and the H value given above is merely an example and may be modified as appropriate.

In S32 the CPU 9 calculates representative values (HSV values) for each hue-region in which pixels have been sorted in S31 and the percentage of the sample image that each hue-region occupies.

The representative values (HSV values) for each hue-region are defined as follows.
Representative values for the R hue-region: sHr, sSr, sVr
Representative values for the G hue-region: sHg, sSg, sVg
Representative values for the B hue-region: sHb, sSb, sVb
Representative values for the C hue-region: sHc, sSc, sVc
Representative values for the M hue-region: sHm, sSm, sVm
Representative values for the Y hue-region: sHy, sSy, sVy Here, the representative values in each hue-region are average values of the HSV values of all the pixels allocated in the subject hue-region. The representative values for each hue-region may be median values or middle values of the HSV values of all the pixels in the subject hue-region.

The percentage that each hue-region occupies in the sample image is defined as follows:
Percentage that the R hue-region occupies in the sample image: sRateR
Percentage that the G hue-region occupies in the sample image: sRateG
Percentage that the B hue-region occupies in the sample image: sRateB
Percentage that the C hue-region occupies in the sample image: sRateC
Percentage that the M hue-region occupies in the sample image: sRateM
Percentage that the Y hue-region occupies in the sample image: sRateY The percentage for the R hue-region, for example, may be defined as sRateR=(number of pixels in the R hue-region of the sample image)÷(total number of pixels in the sample image), or may be defined according to another equation.

Figure 6:
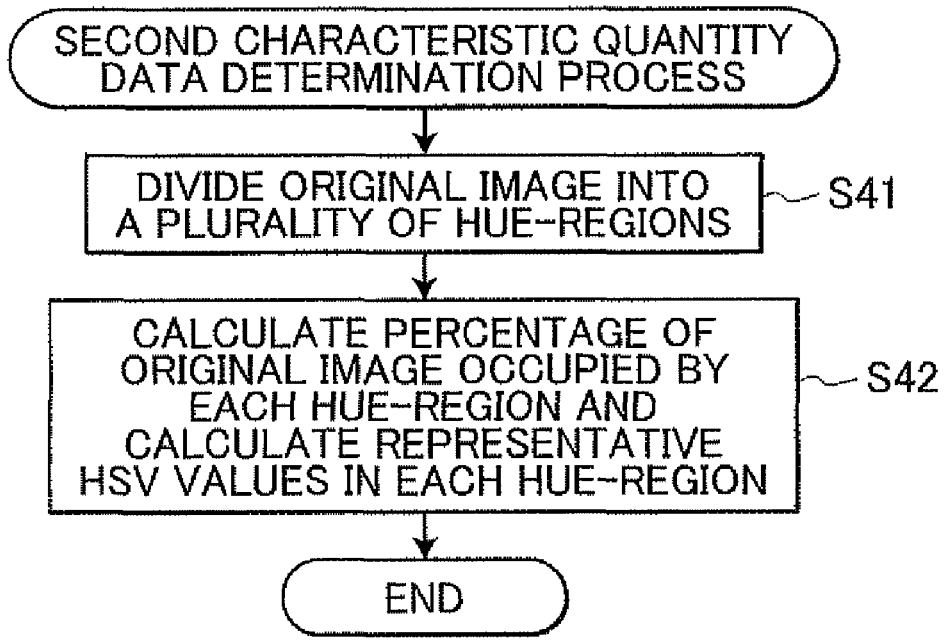
FIG. 6 is a flowchart illustrating steps in a set of second characteristic quantity data determination process.

Next, the second characteristic quantity data determination process of S15 in FIG. 4 for extracting the set of second characteristic quantity data from the original image will be described with reference to FIG. 6. FIG. 6 is a flowchart illustrating steps in the second characteristic quantity data determination process.

Similarly to the pixels in the sample image, in S42 all the pixels in the original image are sorted in the six hue-regions R, G, B, C, M and Y in a manner the same as S31. The representative values (HSV values) for each hue-region are defined as follows.
Representative values for the R hue-region: iHr, iSr, iVr
Representative values for the G hue-region: iHg, iSg, iVg
Representative values for the B hue-region: iHb, iSb, iVb
Representative values for the C hue-region: iHc, iSc, iVc
Representative values for the M hue-region: iHm, iSm, iVm
Representative values for the Y hue-region: iHy, iSy, iVy The percentage that each hue-region occupies in the sample image is defined as follows:
Percentage that the R hue-region occupies in the original image: iRateR
Percentage that the G hue-region occupies in the original image: iRateC
Percentage that the B hue-region occupies in the original image: iRateB
Percentage that the C hue-region occupies in the original image: iRateC
Percentage that the M hue-region occupies in the original image: iRateM
Percentage that the Y hue-region occupies in the original image: iRateY The percentage for the R hue-region, for example, may be defined as ikateR=(number of pixels in the R hue-region of the original image)÷(total number of pixels in the original image), or may be defined according to another equation.

In the present embodiment, the algorithm for determining the set of first characteristic quantity data is identical to the algorithm for determining the set of second characteristic quantity data, but different algorithms may be used.

The set of second characteristic quantity data is determined from data of the original image. However, the set of second characteristic quantity data may be determined form data of the thumbnail image.

Next, the process performed in S17 of FIG. 4 to convert the thumbnail image based on the sets of first and second characteristic quantity data will be described in detail. In this process, the image processor 1 converts the H value, S value, and V value of each pixel in the thumbnail image.

Figure 7:
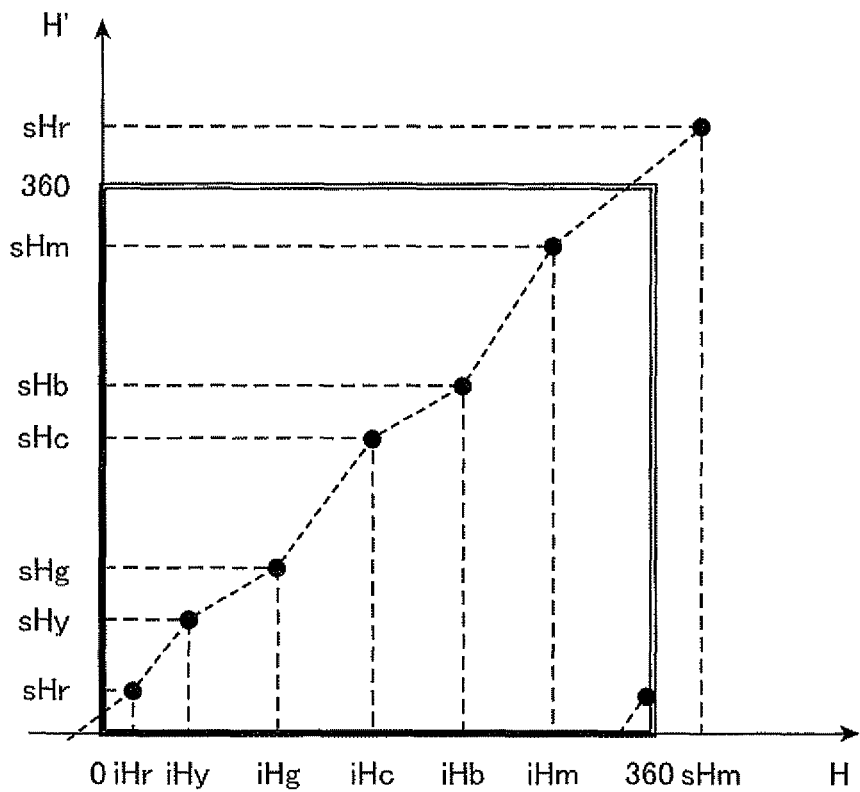
FIG. 7 is a graph for a hue correction table.

First, the conversion process for the H value of each pixel in the thumbnail image will be described. Representative H values for all the hue-regions are plotted in a graph, as shown in FIG. 7, with the X-axis denoting the representative H values in the set of second characteristic quantity data and the Y-axis denoting the representative H values (denoted by H') in the set of first characteristic quantity data. Subsequently, a hue conversion table based on the graph in FIG. 7 is created as indicated by a broken line using linear interpolation, for example, between the plotted points.

The H value of each pixel in the thumbnail image is corrected into a corrected H' value by applying the hue conversion table to the H value in each pixel. More specifically, the corrected H' value is calculated according to the following equation:

$$H'=(y2-y1)\div(x2-x1)\times H-(y2-y1)\div(x2-x1)\times x2+y2 \quad \text{(Equation 1)}$$

Here, H' is set to H'−360 when H'>360.
Here, x1, x2, y1, and y2 are set as follows.
  When H<iHr,
  (x1,y1)=(iHm−360,sHm−360), and
  (x2,y2)=(iHr,sHr).
  When iHr≦H<iHy,
  (x1,y1)=(iHr,sHr), and
  (x2,y2)=(iHy,sHy).
  When tHy≦H<iHg,
  (x1,y1)=(iHy,sHy), and
  (x2,y2)=(iHg,sHg).
  When iHg≦H<iHc,
  (x1,y1)=(iHg,sHg), and
  (x2,y2)=(iHc,sHc).
  When iHc≦H<iHb,
  (x1,y1)=(iHc,sHc), and
  (x2,y2)=(iHb,sHb).
  When iHb≦H<iHm,
  (x1,y1)=(iHb,sHb), and
  (x2,y2)=(iHm,sHm).
  When iHm≦H,
  (x1,y1)=(iHm,sHm), and
  (x2,y2)=(iHr+360,sHr+360).

Next, conversion of the S value and V value in each pixel will be described. The S and V values of each pixel in the thumbnail image are converted in a manner that is determined dependent on the hue-region in which the hue value H of the subject pixel is allocated. For example, values "S" and "V" for a pixel, whose H value is allocated in the R hue-region, are converted into corrected values "S'" and "V'" by the following equations:
  When S≦iSr, $$S'=S\times(sSr\div iSr) \quad \text{(Equation 2)}.$$

When S>iSr, $$S'=1+(S-1)\times\{(1-sSr)\div(1-iSr)\} \quad \text{(Equation 3)}.$$

When V≦iVr, $$V'=V\times(sVr\div iVr) \quad \text{(Equation 4)}.$$

When V>iVr, $$V'=1+(V-1)\times\{(1-sVr)\div(1-iVr)\} \quad \text{(Equation 5)}.$$

S and V values for pixels, whose H values are allocated in other hue-regions, can be similarly calculated. Below, a conversion table defined by the above-described conversion method for S values is referred to as a saturation conversion table, while a conversion table defined by the above-described conversion method for the V value is referred to as a brightness conversion table.

Next, the HSV values of each pixel that have been converted as described above are further converted to a format (RGB values, for example) suitable for the display unit 6. The following method of conversion is merely an example, and it should be apparent that conversion may be performed according to another method.

Method of HSV→RGB conversion
Below, in, fl, m, and n are parameters used in the process of calculating RGB values from HSV values. Here, in will be the integer portion of (H'÷60) and fl will be the decimal portion of (H'÷60).
  When in is even, fl=1−fl.
  m=V'×(1−S')
  n=V'×(1−S'×fl)
  When in is 0,
  R=V'×255,
  G=n×255, and
  B=m×255.
  When in is 1,
  R=n×255,
  G=V'×255, and
  B=m×255.
  When in is 2,
  R=m×255,
  G=V'×255, and
  B=n×255.
  When in is 3,
  R=m×255,
  G=n×255, and
  B=V'×255.
  When in is 4,
  R=n×255,
  G=m×255, and
  B=V'×255.
  When in is 5,
  R=V'×255,
  G=m×255, and
  B=n×255.

In S20 H, S, and V values of each pixel in the original image are corrected by using the set of first characteristic quantity data and the set of second characteristic quantity data in the same manner as the H, S, and V values of the thumbnail image in S17. In this case, the corrected HSV values of each pixel that have been converted are converted to a format (RGB values, for example) suitable for the printer 10.

According to the first embodiment of the invention described above, the user can confirm the results of correction prior to printing. Further, when the thumbnail image is relatively small, the image processor 1 can perform the color conversion process on this thumbnail image quickly, as described above. Further, through the image correction process described above, the image processor 1 can correct color tones in the original image to match color tones in the sample image for each hue region divided based on the H values.

According to the first embodiment, if the original image includes a building and sky, for example, and the user wishes to convert the blue color of the sky to a brilliant ocean blue, the image processor 1 can perform this conversion through an operation using the scanner to scan a photograph of a brilliant ocean as the sample image, for example.

Similarly, the image processor 1 can convert tones in an original image of a person's profile to lighter tones through reading an image data or operating the scanner to scan a photograph, where the image and photograph show the palm of a hand or the like with lighter flesh tones, for example.

Hence, the user can perform desired image correction simply by scanning an image as a model for the image correction, and need not have any special knowledge of image processing since there is no need to input parameters and the like. Further, since the image processor 1 can automatically select hue-regions of an image to subject to correction, the image processor 1 can convert colors in only hue-regions that are easily perceived, while reducing or eliminating the conversion of less noticeable hue-regions.

First Modification of First Embodiment

In a first modification of the first embodiment, the image correction process is modified as described below. According to the first modification, the image correction process is capable of suspending part of the image correction process or controlling the amount of the image correction for each hue-region based on the size of hue-regions. In this way, the user can control the process to reflect only some color tone of the sample image in the color tones of the original image.

FIG. 8 is a flowchart illustrating steps in a basic process according to the first modification. As shown in FIG. 8, steps S51-S55, and S57-S62 in the basic process are the same with the steps S11-15, and S16-21 in the basic process according to the first embodiment (FIG. 4). In the first modification, a process for resetting representative values (S56) is added after the second characteristic quantity data determination process (S55).

Figure 9:
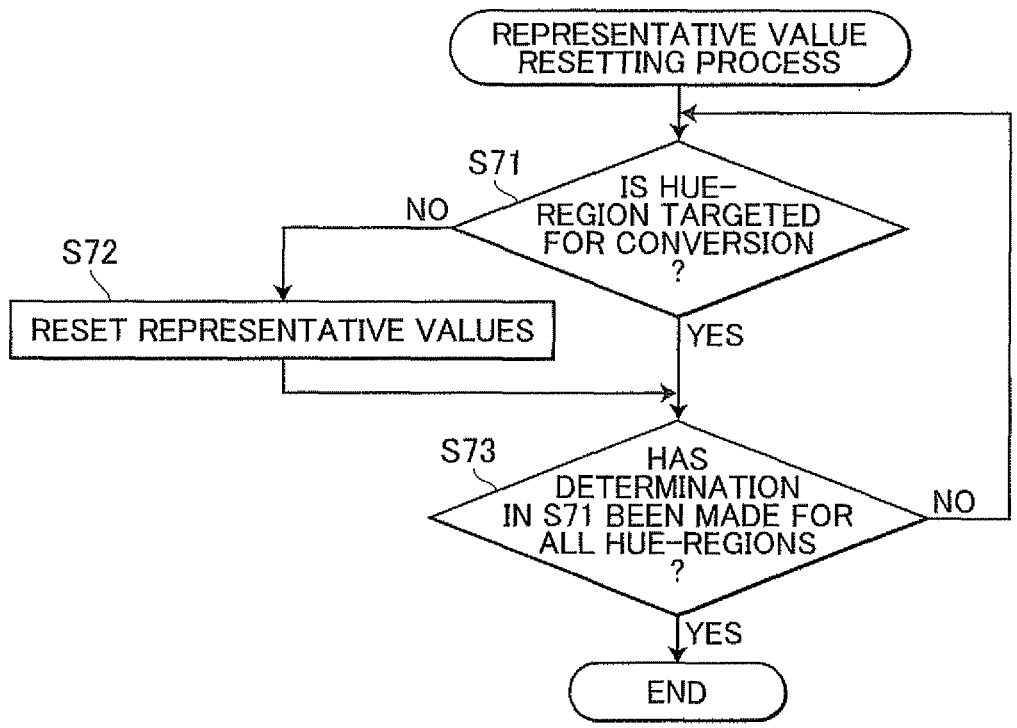
FIG. 9 is a flowchart illustrating steps in a representative value resetting process.

FIG. 9 is a flowchart illustrating steps in the representative value resetting process of S71 shown in FIG. 8. In S71, the CPU 9 determines whether one hue-region among the six hue-regions should be a target of conversion. The CPU 9 performs this determination by determining whether the subject hue-region meets a prescribed condition.

The CPU 9 advances to S72 when determining that the hue-region is not a target of conversion (S71: NO) and advances to S73 when determining that the hue-region is a target of conversion (S71: YES). In S72 the CPU 9 resets the representative values for the subject hue-region and subsequently advances to S73. More specifically, for the hue-region that is not a target of conversion, the CPU 9 resets the hue representative values in the set of first characteristic quantity data and in the set of second characteristic quantity data to be equal to each other, resets the saturation representative values in the set of first characteristic quantity data and in the set of second characteristic quantity data to be equal to each other, and resets the brightness representative values in the set of first characteristic quantity data and in the set of second characteristic quantity data to be equal to each other. For example, the CPU 9 resets the hue representative values to the middle value of the subject hue region, resets the saturation representative values to the middle value (0.5) in the range of saturation (0 to 1), and resets the brightness representative values to the middle value (0.5) in the range of brightness (0 to 1).

In S73 the CPU 9 determines whether the process in S71 for determining whether a hue-region is to be converted has been performed for all hue-regions (six hue-regions in the example). If there remain any hue-regions for which the determination of S71 has not yet been performed (S73: NO), the CPU 9 returns to S71. When a determination has been performed on all hue-regions (S73: YES), the CPU 9 ends the representative value resetting process. Examples of the method of the judgment in S71 include: (A) a method of using a threshold thre; and (B) a method of using data of a hue-region having the largest area.

(A) Method Using a Threshold Thre

The prescribed condition used in the judgment of S71 described above is a relationship between the size of the hue-region in question and a threshold Thre. When the percentage of the original image (or thumbnail image) or sample image occupied by the subject hue-region is less than the threshold Thre (yes in S71), the CPU 9 changes in S72 the representative values in the set of first characteristic quantity data of the original image and the representative values in the set of second characteristic quantity data of the sample image related to this hue-region to the same values, so that conversion will be executed by using the new representative values. The representative values can be changed or reset in the following way:

When sRateR<Thre or iRateR<Thre,
sHr=0, sSr=0.5, sVr=0.5,
iHr=0, iSr=0.5, iVr=0.5.
When sRateG<Thre or iRateG<Thre,
sHg=120, sSg=0.5, sVg=0.5,
iHg=120, iSg=0.5, iVg=0.5.
When sRateB<Thre or iRateB<Thre,
sHb=240, sSb=0.5, sVb=0.5,
iHb=240, iSb=0.5, iVb=0.5.
When sRateC<Thre or iRateC<Thre,
sHc=180, sSc=0.5, sVc=0.5,
iHc=180, iSc=0.5, iVc=0.5.
When sRateM<Thre or iRateM<Thre,
sHm=300, sSm=0.5, sVm=0.5,
iHm=300, iSm=0.5, iVm=0.5.
When sRateY<Thre or iRateY<Thre,
sHy=60, sSy=0.5, sVy=0.5,
iHy=60, iSy=0.5, iVy=0.5.

The above example employs the middle value 0.5 of possible values (0-1) for the S value and V value, and also employs the middle value of the corresponding hue-region for the H value. However, the representative values described above are merely an example, and the invention is not limited to these values.

When converting a pixel using the equations described above (Equations 2-5), the S and V values of the pixel do not change using the representative values described above. For example, when $S \leq iSr$ for the R hue-region, S' is calculated according to equation 2 as follows.

$$S'=S\times(sSr \div iSr)$$

However, since sSr=0.5 and iSr=0.5 in this equation, the equation becomes:

$$S'=S\times(0.5 \div 0.5)=S \quad \text{(Equation 6)}$$

Similarly, S'=S when S>iSr.
The V values in this hue-region are not changed, either. The S and V values in other hue-regions are also not changed in the same manner as described above for R hue-region.

Further, by resetting the representative values for some hue-region in a manner described above, it is possible to reduce the amount of hue conversion in the hue-region. In other words, the amount of conversion can be reduced by modifying the representative values, even when using the conversion equation described above (Equation 1).

Next, a method of determining the threshold Thre will be described. This value Thre can be set based on a sensory evaluation (visual impression). In sensory evaluations, the inventors have confirmed that any hue-region is likely to be perceived when the hue-region occupies more than about 6% of the entire image area. Hence, the threshold Thre can be set to 6%. However, the present invention is not limited to a threshold Thre of 6%.

It is also possible to set the threshold Thre to such a value that can extract hue-regions having a large area relative to other hue-regions. For example, because the image is divided into six hue-regions, the threshold Thre can be set to the inverse value, or ⅙ of the total number of the hue regions.

The number "six" given as an example of the number of hue-regions is identical to a number that is obtained by subtracting the number of the achromatic colors white and black from the number of vertices (eight that is possessed by an RGB color space, which is one of color gamuts expressing colors). The human eyes can differentiate colors sufficiently when the hues are divided into six hue-regions. If the number of the hue regions is set less than six, there is a possibility that the user may not feel that the original image is modified based on the sample image. Dividing the image into more than six hue-regions will increase the conversion accuracy. However, it is likely that the user will not be able to distinguish the differences in color. Further, the number of calculations increases when the number of divisions increases. When using a printer, such an increase in computations increases the time required to obtain the calibrated image as the printing results, potentially leading to more frustration for the user. Therefore, it is thought that six is a preferable number of divisions.

While the same threshold is used for all hue-regions in the above example, a different threshold Thre may be used for each hue-region.

(B) Method Using Data of a Hue-Region having the Largest Area

In the above method (A), a threshold Thre is set and representative values are modified based on this threshold Thre, thereby controlling to suspend the image correction process in some hue-regions and to reduce the amount of conversions. Contrarily, the method (B) enables the image correction process to use data of a hue-region having the largest area in the image in order to incorporate only specific colors of the sample image in the original image.

In this method, the prescribed condition used in the determination of S71 in FIG. 9 is whether a hue-region having the largest area in the original image is the same as a hue region having the largest area in the sample image, and the hue-region in question is the hue-region having the largest area both in the original image and in the sample image. If the judgment in S71 is affirmative, the representative values for hue-regions other than the subject hue-region are reset according to the following equations, where iMaxRate is the percentage of the original image occupied by the largest-area hue-region in the original image, and sMaxRate is the percentage of the sample image occupied by the largest-area hue-region in the sample image.

When sRateR≠sMaxRate or iRateR≠iMaxRate,
sHr=0, sSr=0.5, sV=0.5,
iHr=0, iSr=0.5, iVr=0.5.
When sRateG≠sMaxRate or iRateG≠iMaxRate,
sHg=120, sSg=0.5, sVg=0.5,
iHg=120, iSg=0.5, iVg=0.5.
When sRateB≠sMaxRate or iRateB≠iMaxRate,
sHb=240, sSb=0.5, sVb=0.5,
iHb=240, iSb=0.5, iVb=0.5.
When sRateC≠sMaxRate or iRateC≠iMaxRate,
sHc=180, sSc=0.5, sVc=0.5,
iHc=180, iSc=0.5, iVc=0.5.
When sRateM≠sMaxRate or iRateM≠iMaxRate,
sHm=300, sSm=0.5, sVm=0.5,
iHm=300, iSm=0.5, iVm=0.5.
When sRateY≠sMaxRate or iRateY≠iMaxRate,
sHy=60, sSy=0.5, sVy=0.5,
iHy=60, iSy=0.5, iVy=0.5.

Through this process, only those pixels that are located in the hue-region that has the largest area both in the original image and in the sample image are converted. Accordingly, in the hue-regions other than the largest-area hue-region, S and V values are not converted, and the amount of conversions for H values is reduced.

For example, when the B hue-region occupies the largest area both in the original image and the sample image, the hue correction table of FIG. 7 is modified into a hue correction table, such as shown in the graph of FIG. 10. As shown in the graph of FIG. 10, the representative H values (iHc=180, sHc=180) in the C hue-region adjacent to the B hue-region in the color space and the representative H values (iHb, sHb) in the B hue-region are connected with each other by a straight line, and the representative H values (iHm=300, sHm=300) in the M hue-region adjacent to the B hue-region in the color space and the representative H values (iHb, sHb) in the B hue-region are connected with each other by another straight line.

Therefore, H values are converted in both the C hue-region, where 180<H≦210, and the M hue-region, where 270<H≦300. The amount of conversion increases as the H values become closer to the B hue-region.

In the image correction process according to the first modification described above, it is possible to select hue-regions where conversion is executed. Further, since a portion of the H values in hue-regions not targeted for conversion but adjacent to hue-regions targeted for conversion in the color space are converted, this method can prevent the occurrence of false contour (tone jump) between converted and non-converted hue-regions.

Second Modification of First Embodiment

While the amount of conversion for H values in the hue-regions not targeted for conversion can be reduced in the image correction process according to the first modification, the conversion is not completely eliminated. This is because the H values in hue-regions not targeted for conversion are affected by the representative values in hue-regions targeted for conversion, since linear interpolation is performed using representative values of hue-regions not targeted for conversion, as illustrated in FIG. 10.

Figure 11:
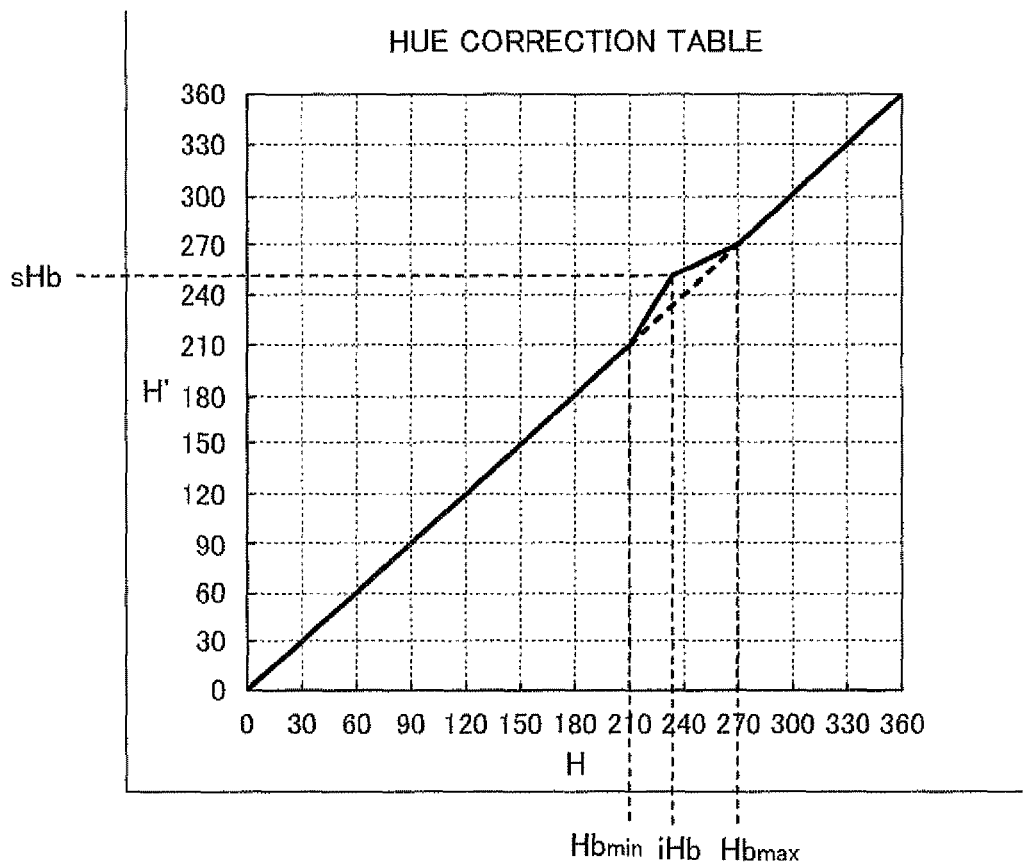
FIG. 11 is a graph for a hue correction table according to a second modification of the first embodiment.

According to the second modification, the hue correction table of FIG. 10 is further modified as shown in the graph in FIG. 11. FIG. 11 shows the hue correction table targeting only the B hue-region for conversion. While only one hue-region is targeted for conversion in FIG. 11, it is also possible to target a plurality of hue-regions.

In FIG. 11, H'=H for values outside the B hue-region, and thus image correction is not performed in these hue-regions. The value of H' in the B hue-region can be found with the following equation, where $Hb_{min}$ is the smallest value of H (210) in the B hue-region and $Hb_{max}$ is the largest value in the B hue-region (270).

When H<iHb, $$H'=Hb\text{min}+(sHb-Hb\text{min})\times(H-Hb\text{min})\div(iHb-Hb\text{min}).$$

When H>iHb, $$H'=sHb+(Hb\text{max}-sHb)\times(H-iHb)\div(Hb\text{max}-iHb).$$

Hence, the above equations can be used to convert pixels in only the targeted hue-region. By converting H values only in the hue-region targeted for conversion, the effects of image correction can be enhanced.

Third Modification of First Embodiment

In the image correction process according to the first embodiment and the first and second modifications, the S value correction curves for the respective hue-regions (conversion equation 2 or 3) are independent from one another.

Figure 12:
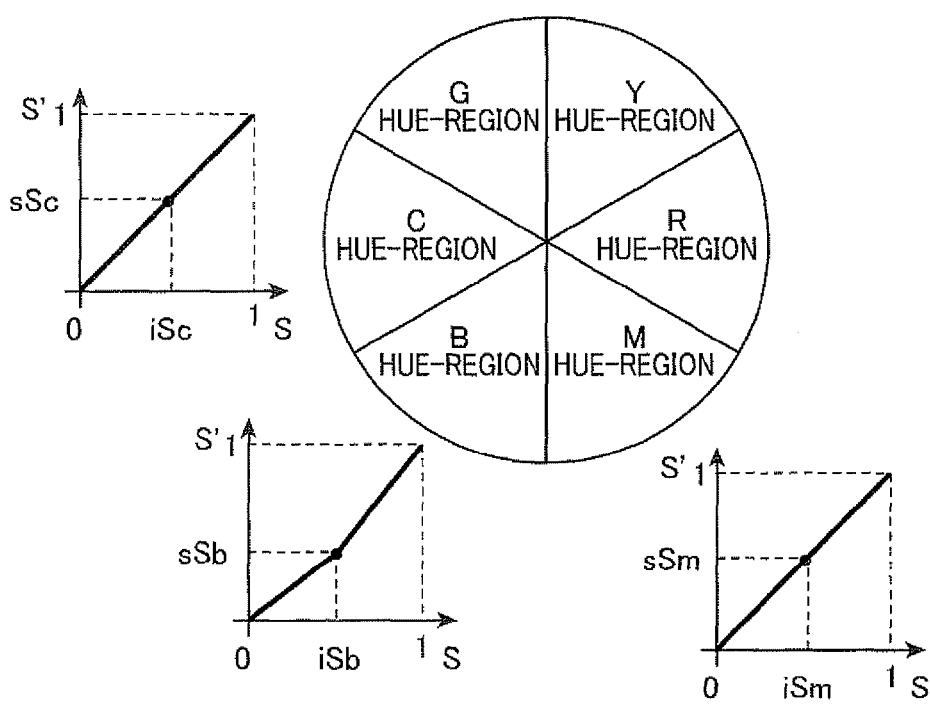
FIG. 12 illustrates saturation correction tables for three color hue-regions.

So, there is a danger of generating false contour (tone jump). More specifically, a table indicating the relationship between S and S' is provided for each hue-region, as shown in FIG. 12, without consideration for the properties of tables for adjacent hue-regions. Similarly, the V value correction curves (conversion equation 4 or 5) for the respective hue-regions are also independent from one another.

Figure 13:
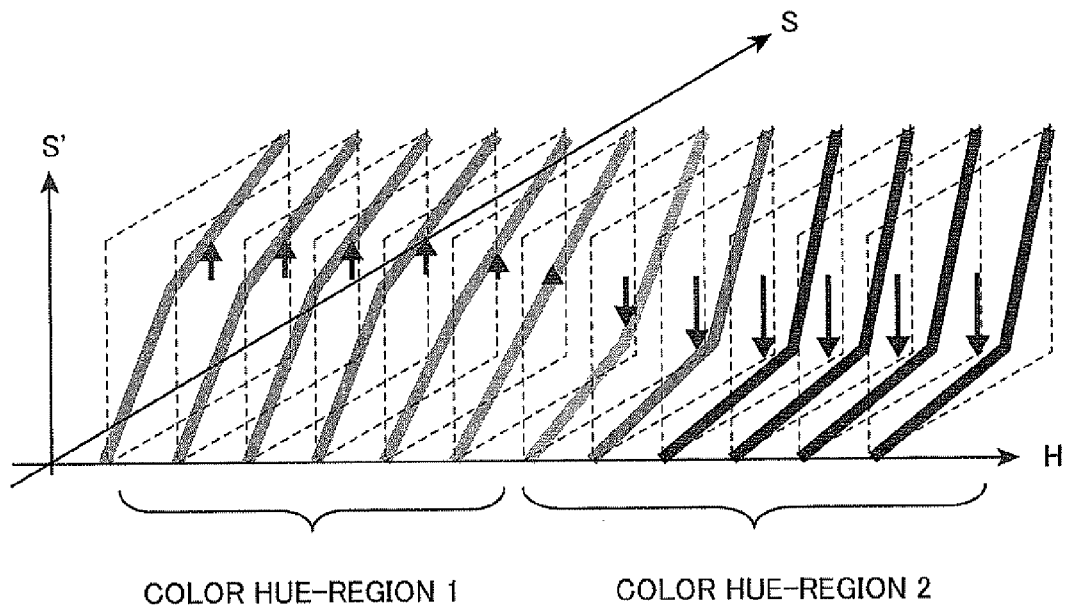
FIG. 13 is an explanatory diagram illustrating changes in a saturation correction curve according to a third modification of the first embodiment.

In an image correction process according to the third modification, tone jump can be prevented by modifying the correction curves in the respective hue-regions so that the correction curves will smoothly change through the hue-regions as shown in FIG. 13.

This image correction process will be described next in detail with reference to FIGS. 14 and 15. Following explanation is for the case where the hue value of a pixel targeted for conversion falls in the B hue-region and is nearer to the C hue-region than to the M hue-region. However, the process is essentially the same for other cases.

The value S of the pixel targeted for conversion is converted into a modified, converted value S" according to equation 7 below using the following parameters.

H: The hue value for the pixel (see FIGS. 14 and 15)
S: The saturation value for the pixel (see FIG. 15)
$Hb_{mid}$: The middle hue value (240) in a target hue-region (B hue-region in this example), where the hue value H of the pixel falls
$Hc_{mid}$: The middle hue value (180) in another hue-region (C hue-region, in this example) that is adjacent to the target hue-region on a side near the hue coordinate position of the hue value H of the pixel (see FIGS. 14 and 15)
Sb': A B-region-dependent converted saturation value for the pixel, which is calculated by using the above-described equation 2 or 3 (the saturation correction table) for the B hue-region based on the saturation value S of the pixel as shown in FIG. 14
Sc': A C-region-dependent converted saturation value for the pixel, which is calculated by using the above-described equation 2 or 3 (the saturation correction table) for the C hue-region based on the saturation value S of the pixel as shown in FIG. 14

$$S''=\{(H-Hc_{mid})\times Sb'+(Hb_{mid}-H)\times Sc'\}\div\{(Hb_{mid}-Hc_{mid})\}$$ (Equation 7)

The value V of the pixel targeted for conversion is converted into a modified, converted value V" according to equation 8 below using the following parameters.

H: The hue value for the pixel (see FIGS. 14 and 15)
V: The brightness value for the pixel
$Hb_{mid}$: The middle hue value (240) in a target hue-region (B hue-region in this example), where the hue value H of the pixel falls
$Hc_{mid}$: The middle hue value (180) in another hue-region (C hue-region, in this example) that is adjacent to the target hue-region on a side near the hue coordinate position of the hue value H of the pixel (see FIGS. 14 and 15)
Vb': A B-region-dependent converted brightness value for the pixel, which is calculated by using the above-described equation 4 or 5 (the brightness correction table) for the B hue-region based on the brightness value V of the pixel
Vc': A C-region-dependent converted brightness value for the pixel, which is calculated by using the above-described equation 4 or 5 (the brightness correction table) for the C hue-region based on the brightness value V of the pixel $$V''=\{(H-Hc_{mid})\times Vb'+(Hb_{mid}-H)\times Vc'\}\div\{(Hb_{mid}-Hc_{mid})\}$$ (Equation 8)

Figure 14:
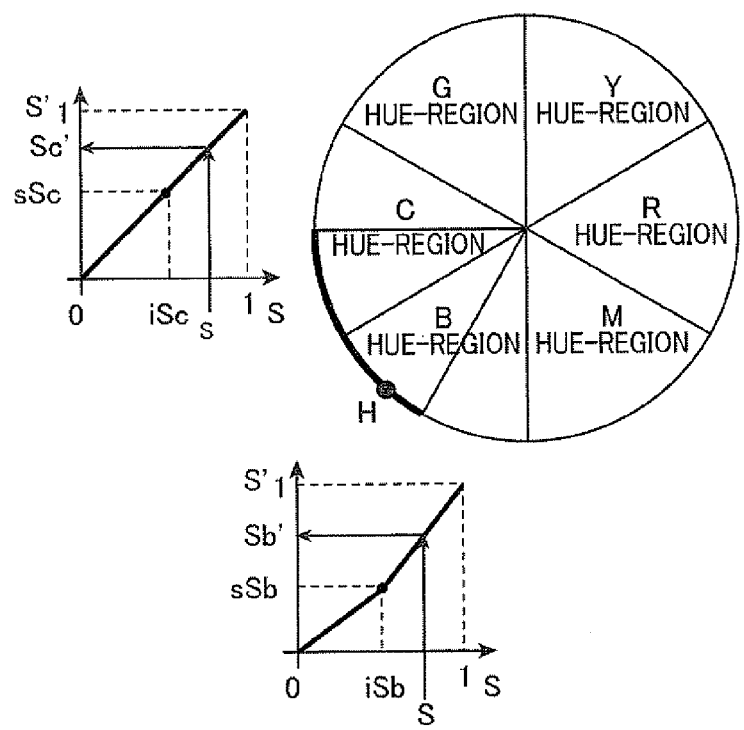
FIG. 14 shows graphs of saturation correction tables for B and C hue-regions.
Figure 15:
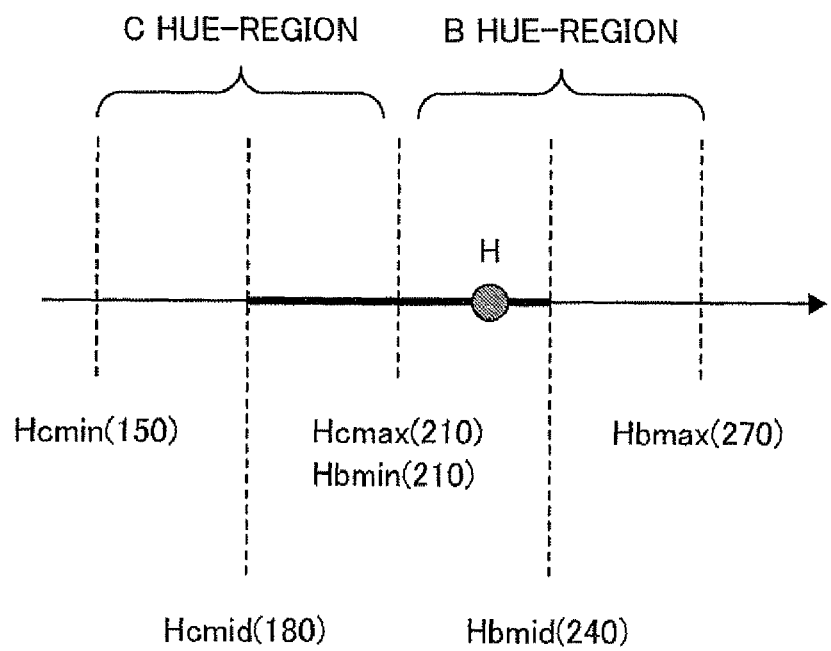
FIG. 15 an explanatory diagram showing parts of the B hue-region and C hue-region targeted for conversion.

The above process is performed when the hue value H of the pixel in question is in the range of $HC_{mid}$ (180) to $Hb_{mid}$ (240) as shown in FIGS. 14 and 15. By finding the output saturation value (S") and brightness value (V") through the above calculations weighted according to the input hue value H, it is possible to produce smooth correction effects between hues.

Image processor 1 may combine the image correction processes described above appropriately. For example, the image processor 1 performs the image correction for the hue value H to emphasize the correction by using, for example, the image correction process in the first or second modification, while performing the image correction for the saturation value S and the brightness value V to reduce tone jump by using the third modification of the image correction process.

Fourth Modification of First Embodiment

In the process shown in FIG. 4, the image processor 1 performs the image correction process on the thumbnail image and performs the image correction process on the original image when the user inputs a print instruction. However, according to a fourth modification, the image processor 1 performs the image correction process on the original image and subsequently generates and displays the thumbnail image by modifying the resolution of the corrected original image.

Figure 16:
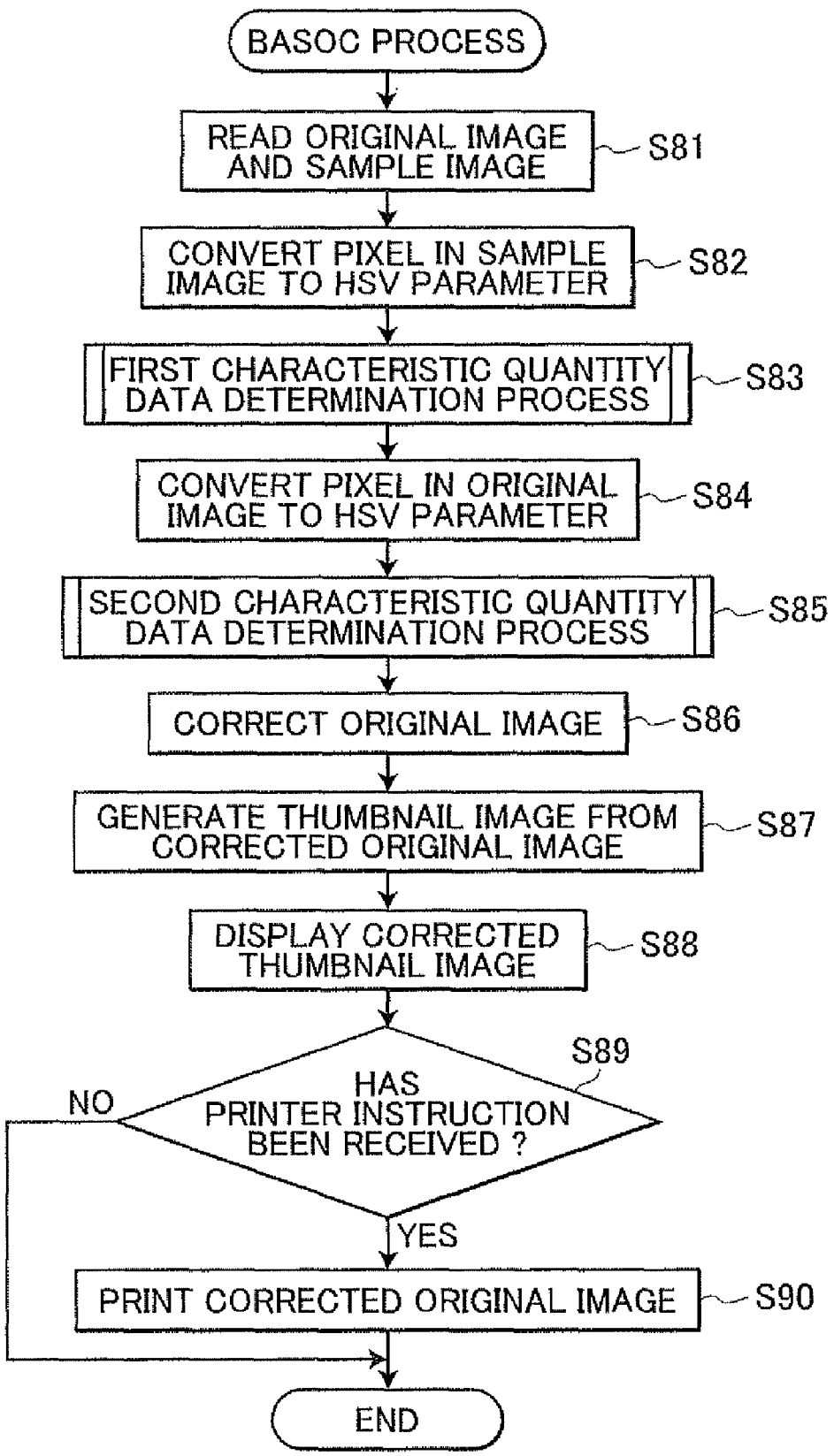
FIG. 16 is a flowchart illustrating steps in a basic process according to a fourth modification of the first embodiment.

FIG. 16 is a flowchart illustrating steps in a basic process according to the fourth modification. While the basic process is essentially the same as that shown in FIG. 4, that is, steps S11-15, S20, S13, S19, and S21 are respectively correspond to S81-81, S86, S83, S89, and S90, the process in FIG. 16 differs in that in S87 the CPU 9 generates a thumbnail image from the corrected original image. Since the original image is corrected prior to generating the thumbnail image in the process of FIG. 16, more processing time is required to display the thumbnail image than when performing the image correction process on a reduced image, as described in FIG. 4. However, the time required to complete the printing process after a print instruction has been received is shortened.

Obviously, the representative value resetting process of S556 may be added to the process in FIG. 16 at the timing after S85.

Fifth Modification of First Embodiment

Figure 17:
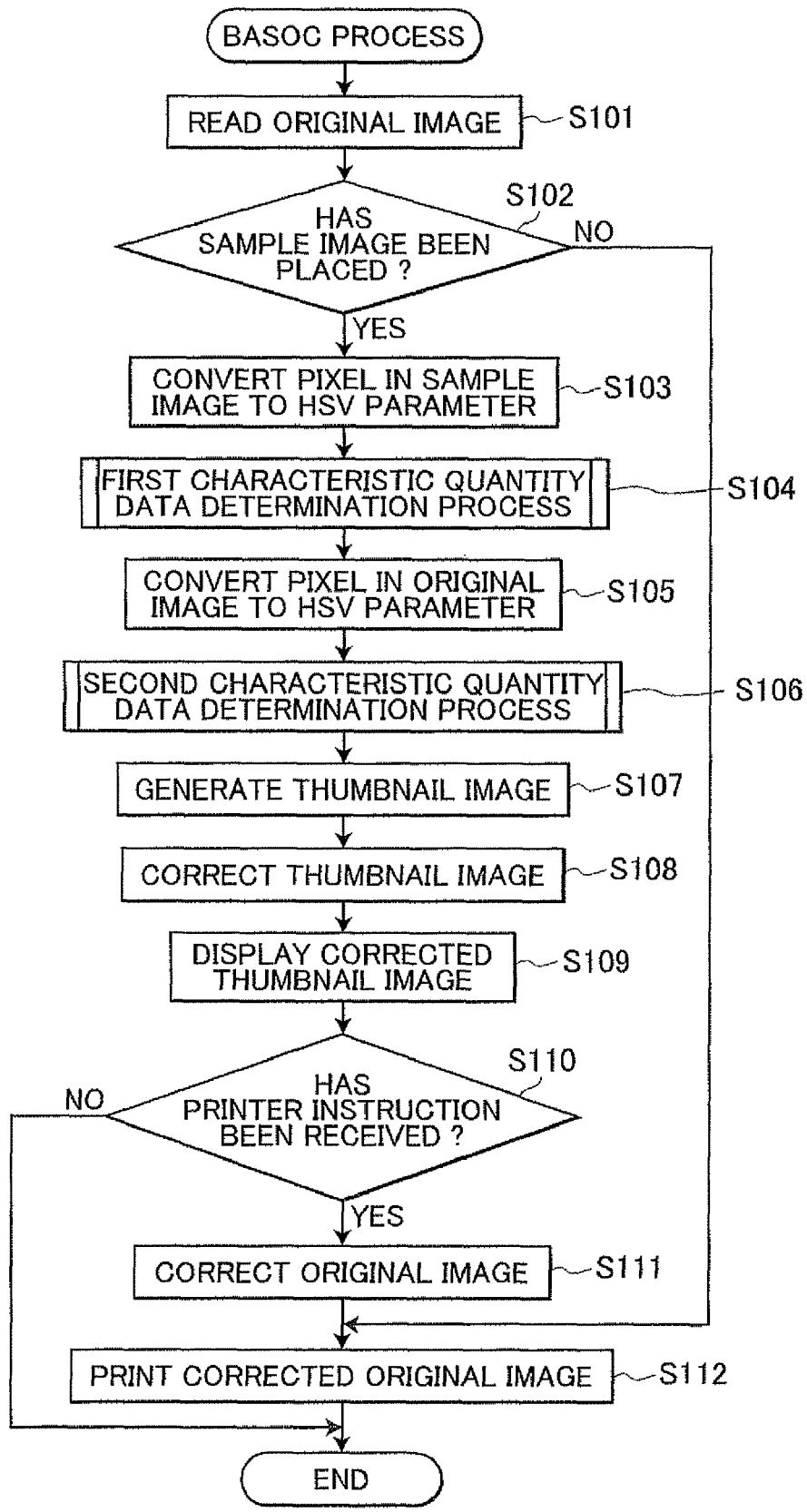
FIG. 17 is a flowchart illustrating steps in a basic process according to a fifth modification of the first embodiment.

FIG. 17 is a flowchart showing steps in a basic process according to a fifth modification. In S101 the CPU 9 reads the original image. In S102 of this modification, the CPU 9 determines whether a sample image has been placed on the image reading section of the scanner 2. If a sample image has been set (S102: YES), the CPU 9 uses this sample image for the image correction process. However, if a sample image has not been set (S102: NO), then the CPU 9 simply prints the original image as is. In this way, the CPU 9 can automatically determine whether or not to perform image correction. Remaining steps S103-S112 correspond to steps S12-S21 in FIG. 4.

The process for determining whether a sample image has been set in S102 may be implemented through a preliminary scanning operation in which the sample image is scanned with a lower resolution than a target resolution for main scanning. That is, the preliminary scanning need not be performed at a high resolution.

Obviously, the representative value resetting process of S56 may be added to the process in FIG. 17 at the timing after S106 or S107.

Since the image processor 1 according to the fifth modification enables the user to visualize details of image correction at a stage prior to printing the image, a more efficient image correction process can be implemented. Further, by performing image correction to approximate features of an image inputted through the scanner, the user can perform intuitive image correction through simple operations.

Sixth Modification of First Embodiment

In S59 of the first and second modifications, the display aspect or state of the corrected thumbnail image may be modified. How to modifying display aspect will be described later.

Figure 18:
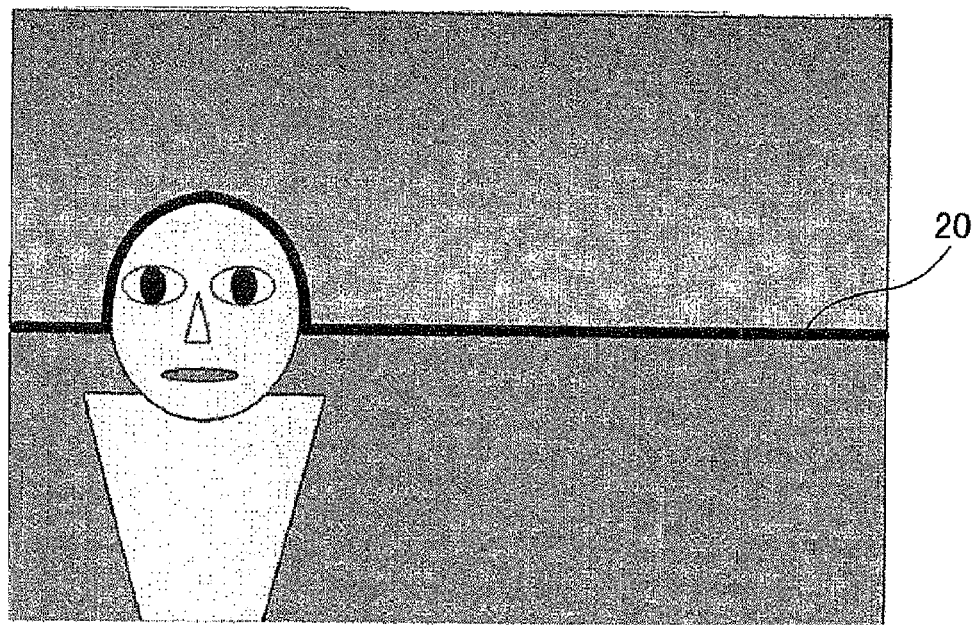
FIG. 18 is an explanatory diagram showing a thumbnail image with a borderline drawn therein according to a sixth modification of the first embodiment.

The image processor 1 according to the first and second modifications described above performs the representative value resetting process of S56, and therefore performs image correction on only a partial region of the thumbnail image (S58), displays the partially corrected thumbnail image (S59), and performs image correction on only a partial region of the original image (S61). That is, those pixels whose hue values belong to a hue-region whose representative values are not reset in S56 are corrected in S58, while remaining pixels are not corrected in S58. In this case, it is preferable to clearly indicate the portion of the thumbnail image that has undergone image correction. In other words, in the sixth modification, the image processor 1 displays the thumbnail image in a manner in which the corrected portion of the thumbnail image can be easily visually perceived as being distinguished from the uncorrected portion. As shown in an example of the thumbnail image shown in FIG. 18, the image processor 1 displays a borderline 20 in the thumbnail image at the border between a corrected region (upper region) and an uncorrected region (lower region). Here, the upper region of FIG. 18 shows blue sky in which the hue values of pixels are within the B hue-region, and the image processor 1 corrects only the pixels whose hue values are within B hue region.

Figure 19:
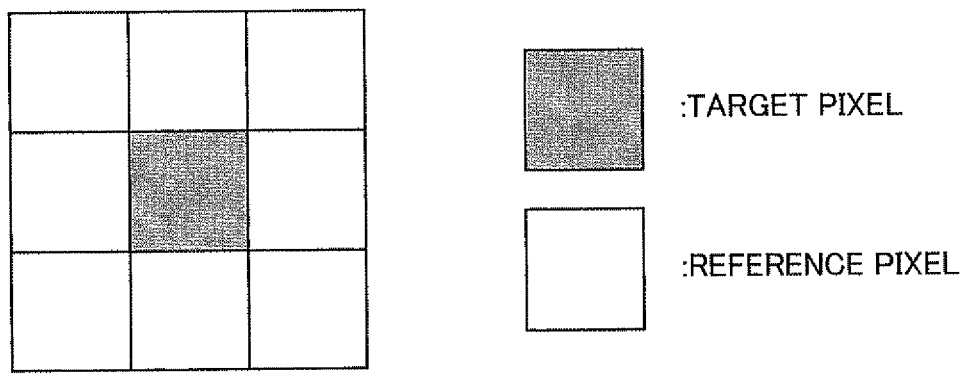
FIG. 19 is an explanatory diagram showing a 3×3 mask used for drawing the borderline.

Next, an example process for generating and displaying the borderline 20 in S59 will be described. The image processor 1 can generate the borderline 20 by changing a color of pixels that are located on a border between corrected and uncorrected regions in the thumbnail image to a different color using a 3×3 mask, such as that shown in FIG. 19. Specifically, the image processor 1 generates the borderline 20 by modifying a color of pixels that meet the following two conditions to a different color, where eight pixels surrounding the target pixel are referred to as reference pixels:
(1) The target pixel is a pixel subjected to image correction
(2) At least one of the reference pixels is not subjected to image correction Further, although the borderline 20 in the above example has a line thickness of one pixel, the width of the borderline 20 may be widened according to the size of the thumbnail image. In this case, it is possible to perform a process to expand the borderline 20.

The borderline 20 may be set to any suitable color. The border line 20 may preferably be set to a color different from both of the corrected and uncorrected regions. For example, it is possible to prompt the user in advance to select a borderline color or to preset this color on the image processor 1.

Figure 20:
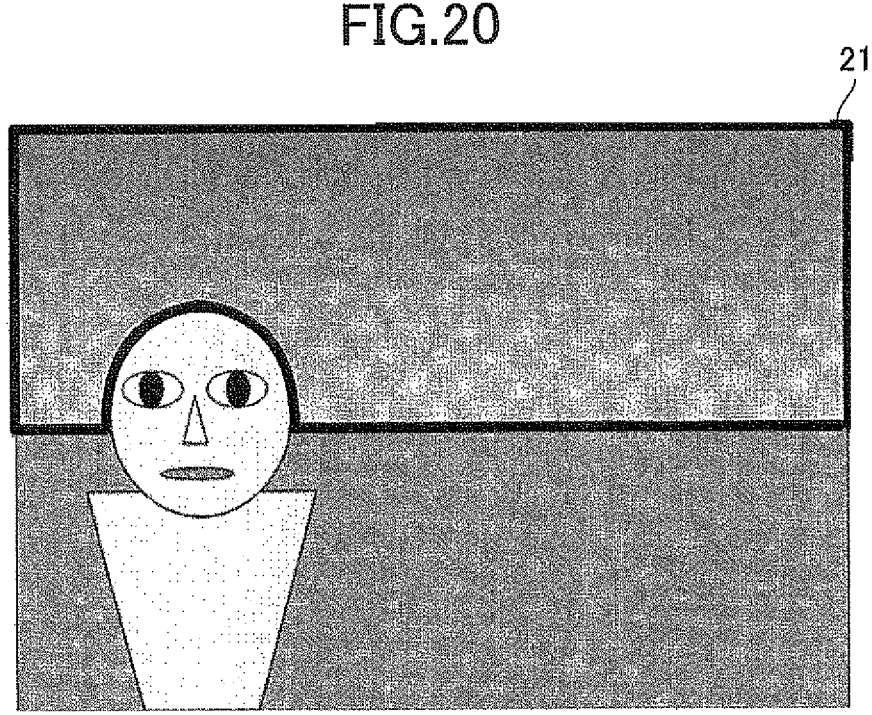
FIG. 20 is an explanatory diagram showing a thumbnail image with a border line drawn therein according to a sixth modification of the first embodiment.

The color of the borderline may also be set to R'G'B' values. That is, the color of the border line may be determined based on a color in the corrected part of the thumbnail image. More specifically, the image processor 1 converts the RGB values of pixels in the border line to R'G'B' values. The R'G'B' values may be generated according to the following equations when the original R, G, and B values are expressed in 256 levels.
R'=255−R
G'=255−G
B'=255−B It is also possible to surround the corrected region with a border 21, as shown in FIG. 20.

Instead of displaying the border line 20 or 21, the uncorrected regions may be displayed in grayscale (achromatic). The RGB pixel values in the uncorrected regions may be converted into achromatic pixel values by employing one of the following methods, for example.
Method Using Average Values
Grayscale pixel values are calculated by converting the RGB pixel values of the uncorrected regions as follows, when the thumbnail image is in the RGB format.
R'=(R+G+B)/3
G'=(R+G+B)/3
B'=(R+G+B)/3
Method Using the Lightness Component Y
Grayscale pixel values are calculated by first calculating the lightness value Y for RGB values of pixels in the uncorrected regions as follows when the thumbnail image is in the RGB format.

$$Y=0.29891 \times R+0.58661 \times G+0.11448 \times B$$

Subsequently, the R'G'B' values of pixels in the uncorrected regions are set to R'=G'B'=Y. This method of calculating the Y value is merely an example, and the Y value may be calculated according to another method.

It is also possible to reduce the gradation level in the region converted to an achromatic color. Specifically, pixels expressed in 256 levels may be rendered in 128 levels. The image processor 1 may also convert the uncorrected regions to an achromatic color while displaying the borderline 20 or 21.

If the processes of the fourth and fifth modifications are modified to include the representative value resetting process, the sixth is modification is applicable also to the fourth and fifth modification.

In the first embodiment and the third modifications, there will be the case where the thumbnail image is partially corrected dependently on the relationship between the representative values in the first and second characteristic quantity data. In such a case, the display state of the thumbnail image may be modified as the sixth modification.

In the above described first embodiment and there modifications, the set of second characteristic quantity data used for correcting the original image and the thumbnail image is determined based on the original image. However, the set of second characteristic quantity data used for correcting the thumbnail image may be determined based on the thumbnail image. The second characteristic quantity data used for correcting the original image may also be determined based on the thumbnail image.

Second Embodiment

Figure 21:
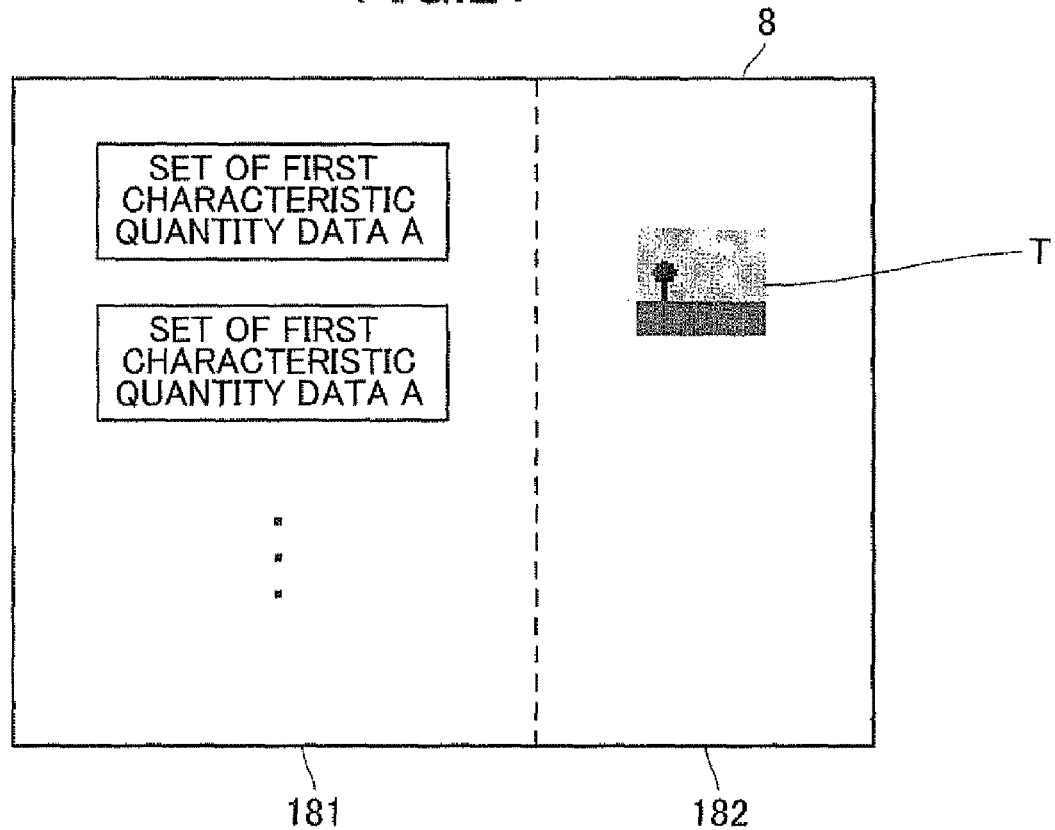
FIG. 21 is an explanatory diagram showing a plurality of sets of first characteristic quantity data and a test image stored in a ROM of an image processor according to a second embodiment.

An image processor 100 according to the second embodiment is the same with the image processor 1 according to the first embodiment except for the following poins. In the first embodiment, a set of first characteristic quantity data is extracted from a sample image. However, in the second embodiment, a plurality of sets of first characteristic quantity data is pre-stored in the ROM 8. FIG. 21 shows data stored in the internal memory (ROM 8) of the image processor 1. As shown in FIG. 21, the RON 8 includes a characteristic quantity storing area 181 and a test image storing area 182. The first characteristic quantity storing area 181 stores a plurality of sets of first characteristic quantity data (a set of first characteristic quantity data A, a set of first characteristic quantity data B, . . . ). The plurality of sets of first characteristic quantity data have been previously extracted from a plurality of sample images and stored in the first characteristic quantity storing area 181. The test image storing area 182 stores data of a test image T.

Next, a main process according to the second embodiment will be described. As shown in FIG. 22, steps 101-104 are the same with the steps 1-4 in the main process of the first embodiment. Thus, the detailed description for the steps 101-104 is omitted here.

After executing the step 104, the image processor 100 corrects the test image T by using the plurality of sets of first characteristic quantity data to create a plurality of corrected test images CT, and displays the plurality of corrected test images CT indicative of a plurality of image corrections that can be executed by the image processor 100 (step 105).

Using the control panel 4 or the touch panel, the user selects, from the displayed corrected test images CT, one corrected test image CT that shows the user's desired correction states (step 106).

Next, the image processor 100 performs an image correction process on the original image based on one set of first characteristic quantity data that has been used to create the user's selected corrected test image CT and the set of second characteristic quantity data of the original image (step 107).

When necessary, a printing process may be performed to print the corrected original image.

Next, the basic process performed on the image processor 100 will be described with reference to FIG. 23. FIG. 23 is a flowchart illustrating steps in the basic process according to the second embodiment.

In S1011 of the basic process, the CPU 9 reads the original image into the RAM 7, for example. Here, there is no particular restriction on the format of the image read in S1011. In S1012 the CPU 9 converts each pixel of the original image read in S1011 to HSV parameters. The process for converting pixels to HSV parameters is the same with the converting process (S14) described in the first embodiment.

In S1013 the CPU 9 determines a set of second characteristic quantity data of the original image based on the HSV parameters. This process for determining the set of second characteristic quantity data is the same with the process for determining the set of second characteristic quantity data (S15) described in the first embodiment.

In S1014 the CPU 9 generates a plurality of corrected test images CT. The process for generating the corrected test images CT will be described later in greater detail.

In S1015 the CPU 9 displays the corrected test images CT, prompts the user to select, from among the corrected test images CT, one corrected test image CT that shows the user's desired corrected state of the test image T. The CPU 9 identifies the user's selected corrected test image CT as a model for performing image correction on the original image. The process for displaying corrected test images CT will be described later.

In S1016 the CPU 9 identifies one set of first characteristic quantity data that has been used for creating the identified corrected test image CT.

In S1017 the CPU 9 corrects colors in the original image based on the set of first characteristic quantity data identified in S1016 and the set of second characteristic quantity data determined in S1013. At this time, the HSV parameters are converted to other parameters, such as RGB parameters, as needed. The process for correcting the original image is the same with the correcting process (S20) described in the first embodiment.

In S1018 the CPU 9 prints the corrected original image.

Next, how to generate the corrected test images CT in S1014 will be described in detail. As shown in FIG. 21, since only the plurality of sets of first characteristic quantity data, and not the plurality of sample images from which the plurality of sets of first characteristic quantity data are derived, are stored in the ROM 8 (internal memory), the required storage capacity of the ROM 8 (internal memory) can be reduced.

In S1014, the image processor 100 reads a single set of first characteristic quantity data among the plurality of sets of first characteristic quantity data stored in the first characteristic quantity storing area 181 and corrects colors in the test image T based on this single set of first characteristic quantity data and a set of third characteristic quantity data that is determined based on the test image T. Here, the set of third characteristic quantity data is also of the same type as the set of second characteristic quantity data described above.

Specifically, the set of third characteristic quantity data includes following information.

Representative values for the R hue-region: tHr, tSr, tVr
Representative values for the G hue-region: tHg, tSg, tVg
Representative values for the B hue-region: tHb, tSb, tVb
Representative values for the C hue-region: tHc, tSc, tVc
Representative values for the M hue-region: tHm, tSm, tVm
Representative values for the Y hue-region: tHy, tSy, tVy
Percentage that the R hue-region occupies in the test image T: tRateR
Percentage that the G hue-region occupies in the test image T: tRateG
Percentage that the B hue-region occupies in the test image T: tRateB
Percentage that the C hue-region occupies in the test image T: tRateC
Percentage that the M hue-region occupies in the test image T: tRateM
Percentage that the Y hue-region occupies in the test image T: tRateY The percentage for the R hue-region, for example, may be defined as tRateR=(number of pixels in the R hue-region of the test image)÷(total number of pixels in the test image), or may be defined according to another equation.

The set of third characteristic quantity data may be stored in the ROM 8 in advance together with the plurality of sets of first characteristic quantity. Alternatively, the set of third characteristic quantity data may be extracted from the test image T in a process same as the process for determining the set of second characteristic quantity data (S1013) each time the test image T is corrected. When storing the set of third characteristic quantity data in the ROM 8 in advance, it is not necessary to determine the set of third characteristic quantity data for each image correction process, thereby reducing the processing load on the image processor 100. On the other hand, when not storing the set of third characteristic quantity data in the ROM 8, it is possible to reduce the volume of data stored, thereby avoiding strain on the storage capacity.

The conversion process for the H value of each pixel in the test image T is the same with the conversion process (S17, FIG. 4) for the H value of each pixel in the thumbnail image described in the first embodiment. That is, representative H values for all the hue-regions are plotted in a graph with the X-axis denoting the representative H values of the third set of characteristic quantity data and the Y-axis denoting the representative H values (denoted by H') of the set of first characteristic quantity data. Subsequently, similarly to the broken line shown in FIG. 7, a hue conversion table is created using linear interpolation, for example, between the plotted points.

The H value of each pixel in the test image T is corrected into a corrected H' value by applying the hue conversion table to the H value in each pixel. That is, the corrected H' value is calculated according to the equation 1 described in the first embodiment. Here, in the second embodiment, the variables x1, x2, y1, and y2 are set as follows.

When H<tHr,
(x1,y1)=(tHm−360,sHm−360), and
(x2,y2)=(tHr,sHr).
When tHr≦H<tHy,
(x1,y1)=(tHr,sHr), and
(x2,y2)=(tHy,sHy)
When tHy≦H<tHg,
(x1,y1)=(tHy,sHy), and
(x2,y2)=(tHg,sHg).
When tHg≦H<tHc,
(x1,y1)=(tHg,sHg), and
(x2,y2)=(tHc,sHc).
When tHc≦H<tHb,
(x1,y1)=(tHc,sHc), and
(x2,y2)=(tHb,sHb).
When tHb≦H<tHm,
(x1,y1)=(tHb,sHb), and
(x2,y2)=(tHm,sHm).
When tHm≦H,
(x1,y1)=(tHmr,sHm), and
(x2,y2)=(tHr+360,sHr+360).

Next, conversion of the S value and V value in each pixel will be described. Similarly to the first embodiment, the S and V values of each pixel in the test image T are converted dependent on the hue-region in which the hue value H of the subject pixel is allocated. For example, values "S" and "V" for a pixel, whose H value is allocated in the R hue-region, are converted into corrected values "S'" and "V'" by the following equations:

When S≦tSr, $$S'=S\times(sSr\div tSr) \quad \text{(Equation 2')}.$$

When S>tSr, $$S'1+(S-1)\times\{(1-sSr)\div(1-tSr)\} \quad \text{(Equation 3')}.$$

When V≦tVr, $$V'=V\times(sVr\div tVr) \quad \text{(Equation 4')}.$$

When V>tVr, $$V'=1+(V-1)\times\{(1-sVr)\div(1-tVr)\} \quad \text{(Equation 5')}.$$

S and V values for pixels, whose H values are allocated in other hue-regions, can be similarly calculated.

Figure 24:
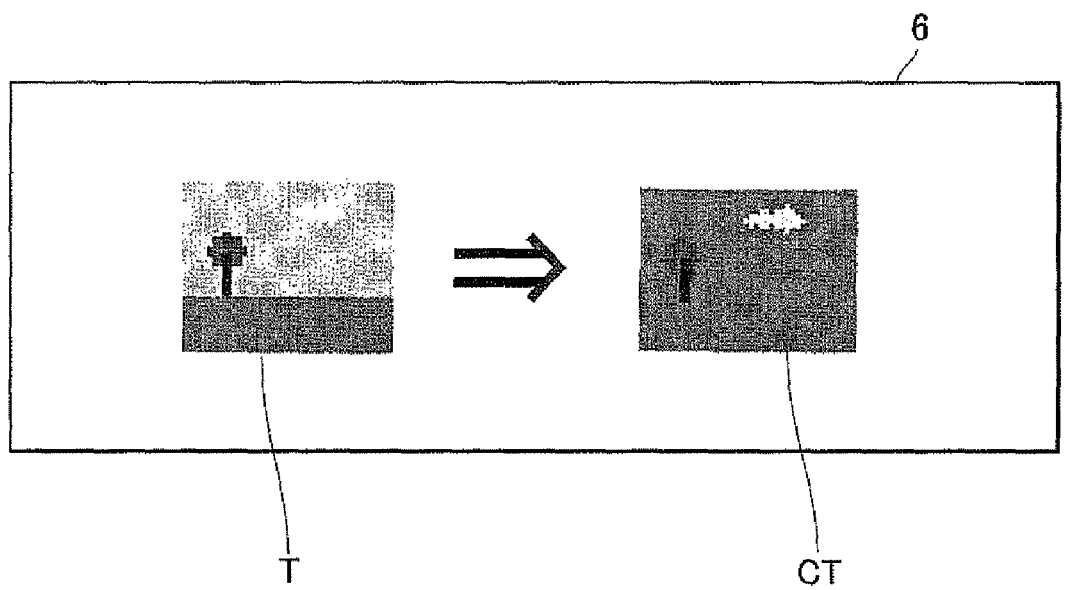
FIG. 24 is an explanatory diagram showing a test image before and after correction.

A plurality of corrected test images CT are generated by performing the above process to correct the test image T according to each of the plurality of sets of first characteristic quantity data in the order of the sets of first characteristic quantity data A, B, . . . and subsequently displaying the corrected test images CT. At this time, the corrected test images CT may be displayed together with the test image T, as shown in FIG. 24. Further, the plurality of corrected test images CT may be displayed simultaneously so that the user can easily select a desired corrected test image CT.

Further, while only one test image T is shown in the example of FIG. 21, a plurality of test images T may be stored on the image processor 100.

In the color correction process performed on the original image in S1017, the image processor 100 corrects the original image using the set of first characteristic quantity data identified in S1015 and the set of second characteristic quantity data of the original image. The method of correction is identical to the method performed on the test image T described above. That is, the method of correction is identical to the method performed in S20 of the first embodiment.

According to the second embodiment described above, the image processor 100 corrects a pre-stored test image T based on the pre-stored plurality of sets of first characteristic quantity data and a set of third characteristic quantity data extracted from the test image T, and corrects an original image using the set of first characteristic quantity data that has been used in the correction of the test image T selected by the user. Further, through the image correction process described above, the image processor 100 can correct, for each hue-region, color tones in the original image to match color tones of a sample image from which the set of first characteristic quantity data that is used to correct the user's selected, corrected test image CT is derived. Further, less storage capacity is required since the image processor 100 stores only the plurality of sets of first characteristic quantity data and not the sample images on which the plurality is of sets of first characteristic quantity are based.

First Modification of Second Embodiment

Figure 25:
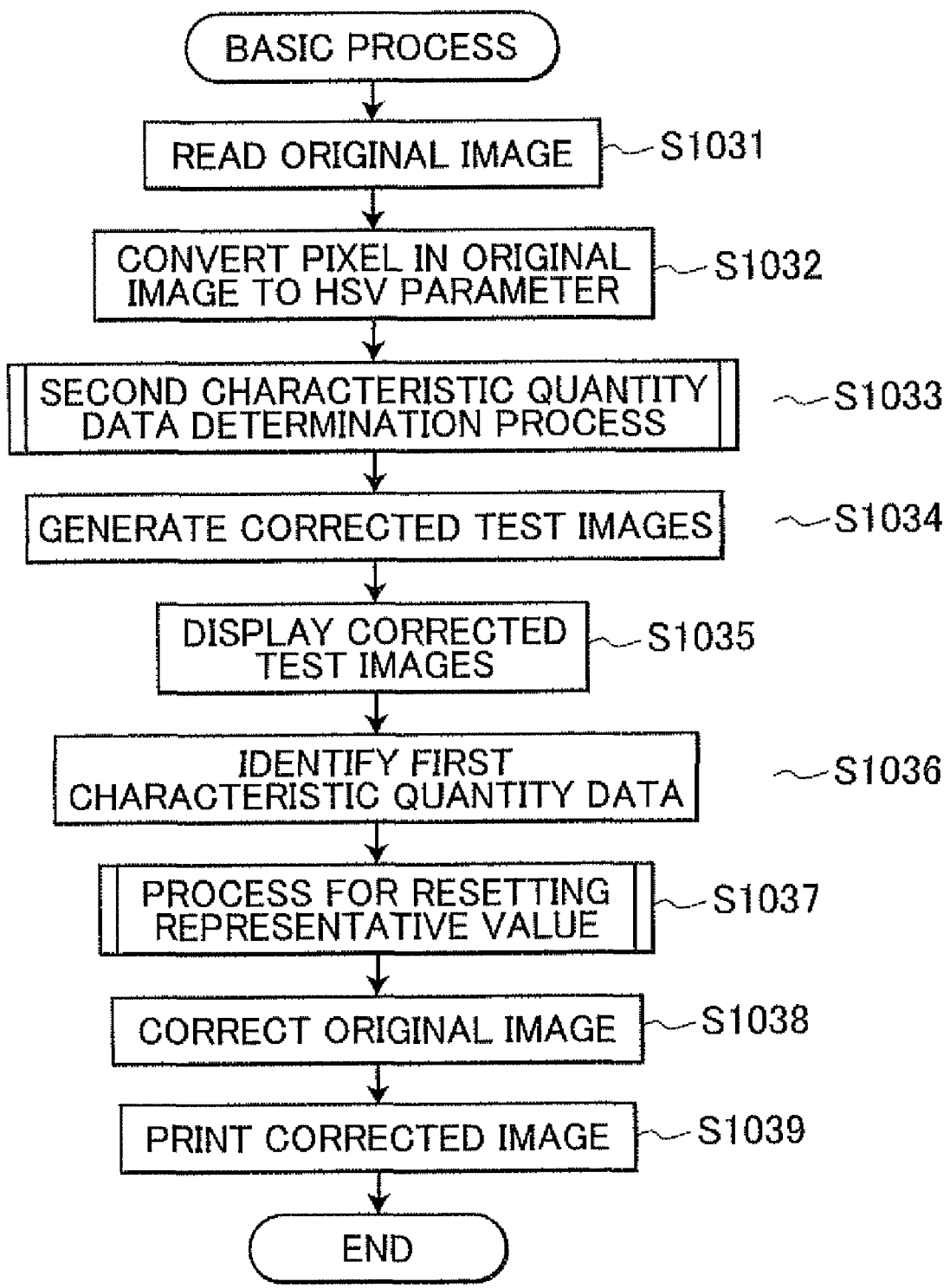
FIG. 25 is a flowchart illustrating steps in a basic process that performs a process for resetting representing values according to a first modification of the second embodiment.

The process for resetting representative values that is described in the first modification of image correction may be performed in the second embodiment. FIG. 25 shows a flowchart illustrating a main process in which the process for resetting representing values is performed. Steps S1031-1036, S1038, and S1039 are the same with the steps S1011-1016, S1017, and S1018 shown in FIG. 23. The process for resetting representative values in S1037 is the same as the process for resetting the representative values (S56) in the first embodiment described with reference to FIG. 9. Therefore, the detailed explanation of these steps are omitted here.

Further, the second to third modifications of the image processes according to the first embodiment are also applicable to the image process according to the second embodiment.

Second Modification of Second Embodiment

In the second embodiment described above, the image processor 100 creates a plurality of corrected test images CT by correcting the stored test image T by using the plurality of sets of first characteristic quantity data, respectively. According to this modification, the image processor 100 creates a plurality of patch images P showing details of image corrections represented by the plurality of sets of first characteristic quantity data so that the user can intuitively grasp the details of the image corrections.

Figure 26:
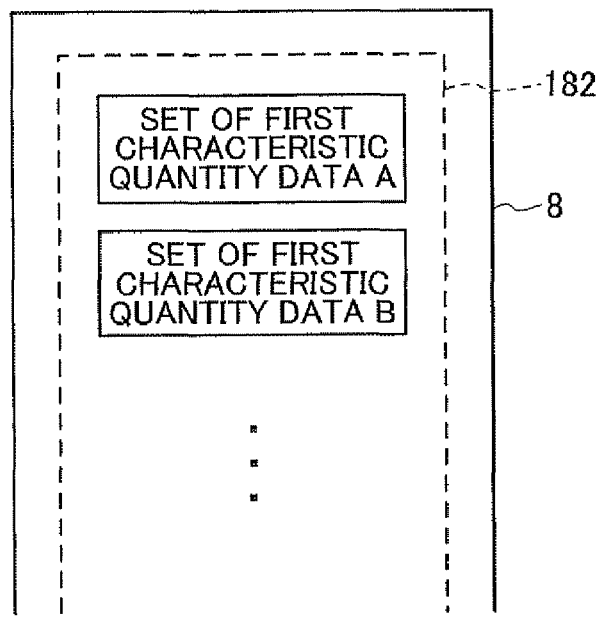
FIG. 26 is an explanatory diagram showing a plurality of sets of first characteristic quantity data stored in the ROM according to a second modification of the second embodiment.

As shown in FIG. 26, in this modification, the ROM 8 (the internal memory) includes only the first characteristic quantity storing area 181 that stores the plurality of sets of first characteristic quantity data (a set of first characteristic quantity data A, a set of first characteristic quantity data B, . . . ). No test image T is stored in the ROM 8 (internal memory).

According to the present modification, the processes of S1014-S1016 (FIG. 23) in the second embodiment are modified as described below. That is, in S1014 a plurality of patch images P are generated in one to one correspondence with the plurality of sets of first characteristic quantity data. In S1015, the plurality of patch images P is displayed on the display unit 6 to prompt the user to select one of the plurality of patch images that shows his/her desired image correction. In S1016 the CPU 9 identifies one set of first characteristic quantity data corresponding to the user's selected patch image P.

Figure 27:
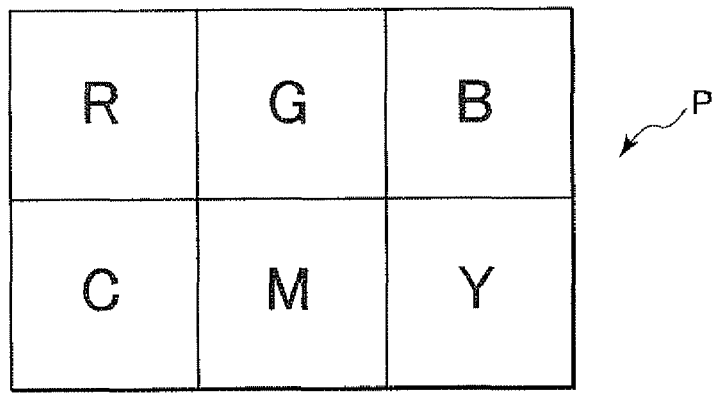
FIG. 27 is an explanatory diagram showing an example of a patch image.

Next, how to generate the patch images P will be described in greater detail. Each set of first characteristic quantity data includes representative values H, S, and V for each of the sixth hue regions, as described above. One patch image P is generated to have six color regions, as shown in FIG. 27, in one to one correspondence with the six hue-regions based on the corresponding set of first characteristic quantity data. Each of the six color regions is formed in a single color that is determined by the representative values H, S, and V for the corresponding hue-region included in the corresponding set of first characteristic quantity data. The plurality of patch images P for the plurality of sets of first characteristic quantity data A, B, . . . are generated to enable the user to visualize how image corrections will be performed by using the plurality of sets of first characteristic data, respectively. In other words, the plurality of patch images P visually indicate characteristic of the plurality of sample images, from which the plurality of sets of first characteristic quantity data are desired.

The image processor 100 generates patch images P by using only the first characteristic quantity data so that the user can predict how the original image will be corrected by each of the plurality of sets of first characteristic quantity data.

The present modification can be applied to the first modification of the second embodiment (FIG. 25). In this case, if the method (A) is employed in S1037 to use the prescribed amount or threshold "Thre" in S71 (FIG. 9), image correction will not be performed in S1038 on such a hue region whose percentage relative to at least one of the original image and the sample image is smaller than the prescribed amount "Thre,". So, in S1034 the color patch image P is prepared not to include a color region whose corresponding hue region is not targeted for image correction. That is, in S1034, the CPU 9 examines the percentages in the second characteristic quantity data set and in all the first characteristic quantity data sets. The CPU 9 then examines, for each set of first characteristic quantity data, whether at least one of the percentages in the set of first and second characteristic quantity data for one hue region is smaller than the prescribed value. If at least one of the percentages in the set of first characteristic quantity data and the set of second characteristic quantity data for some hue region is smaller than the prescribed value, it is known that the one hue region is not targeted for image correction in S1038. So, the CPU 9 omits a color region corresponding to the hue-region from the patch image P.

Figure 28:
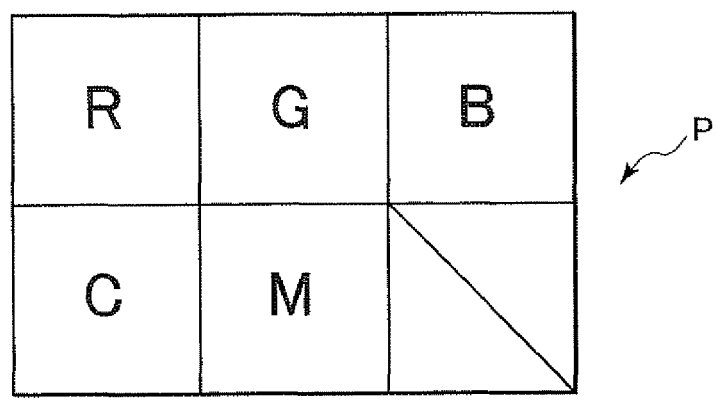
FIG. 28 is an explanatory diagram showing another example of the patch image.

FIG. 28 indicates the color patch P that is prepared when the Y region will not be subjected to image correction.

Further, the layout of the six hue regions in FIG. 28 is merely an example and may be modified.

Figure 29:
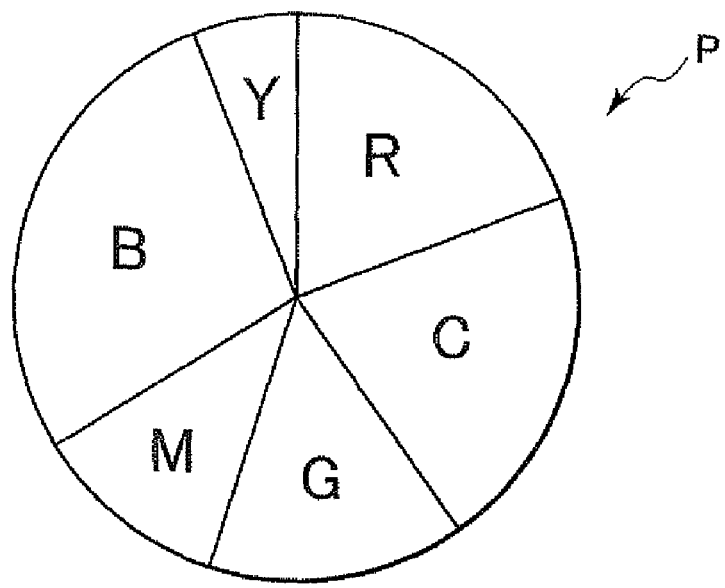
FIG. 29 is an explanatory diagram showing another example of the patch image.

Further, each patch image P may be prepared so that each color region is produced at a percentage equivalent to the percentage of a corresponding hue region in the corresponding set of first characteristic quantity data. That is, the area of each color region is proportional to the percentage in the set of first characteristic quantity data for the corresponding hue region. FIG. 29 shows an example in which the patch image P reflects the percentages of regions in the corresponding set of first characteristic quantity data. With FIG. 29, the user can intuitively visually know that the corresponding set of first characteristic quantity data is acquired from a sample image having a relatively large B region and a relatively small Y region.

Figure 30:
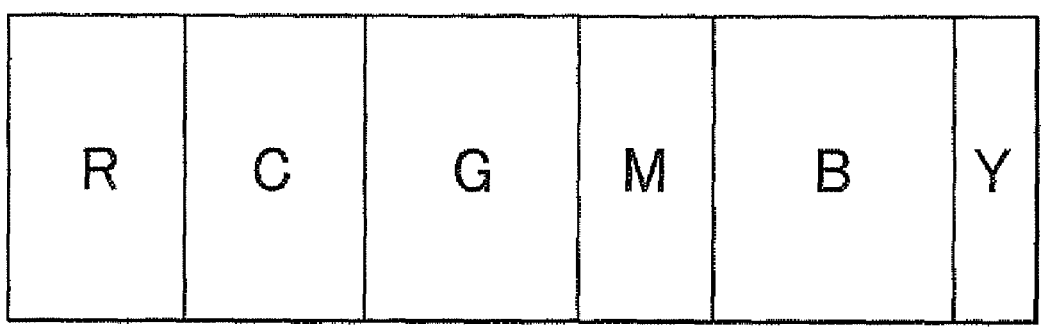
FIG. 30 is an explanatory diagram showing another example of the patch image.

Further, rather than the pie chart shown in FIG. 29, the hue regions may be displayed as a bar graph, as shown in FIG. 30.

In the presentation of correction images using the patch images P described above, the user can intuitively visualize the distribution of colors in the model used for image correction.

While the invention has been described in detail with reference to the above-described embodiments thereof, it would be apparent to those skilled in the art that various changes and modifications may be made therein without departing from the spirit of the invention. For example, instead of scanning a sample image with the scanner, the image processor 1 can read an image from a storage medium as the sample image. Further, the image processor 1 can scan an original image using the scanner rather than reading the original image from a storage medium. Further, while the embodiments describe a multifunction device having a scanner and printer as the image processor, a data processor such as a personal computer may be used to perform image correction and to direct a printer connected to the data processor to perform a printing process.

Further, the process shown in the flowcharts described above is merely an example, and another process may be implemented based on another flowchart, provided that the process obtains similar effects to the process described in the embodiments.

Further, the invention is not limited to printing a corrected original image, but may also store the corrected original images in a storage medium or transfer the corrected original images to another device.

What is claimed is:

1. An image processor comprising:
   a first receiving unit that receives a first image;
   a second receiving unit that receives a second image;
   a thumbnail generating unit that generates a thumbnail image based on the second image;
   a first characteristic quantity data determining unit that determines a set of first characteristic quantity data based on the first image;
   a second characteristic quantity data determining unit that determines a set of second characteristic quantity based on one of the second image and the thumbnail image;
   a correcting unit that corrects the thumbnail image and the second image by using the set of first characteristic quantity data and the set of second characteristic quantity data;
   a display unit that displays the corrected thumbnail image to prompt a user to input his/her instruction to print the corrected second image; and
   a printing process executing unit that executes, upon receipt of the user's instruction, a process for recording the corrected second image on a recording medium.

2. The image processor according to claim 1, further comprising a correction data creating unit that creates correction data based on the set of first characteristic quantity data and the set of second characteristic quantity data.

3. The image processor according to claim 2,
   wherein the first characteristic quantity data determining unit further comprises:
   a first dividing unit that divides a plurality of pixels constituting the first image into a plurality of hue-regions;
   a first hue data determining unit that determines first hue-related data for each hue-region of the first image based on data of the first image; and
   a first non-hue data determining unit that determines first non-hue-related data for each hue-region of the first image based on the data of the first image,
   wherein the second characteristic quantity data determining unit comprises:

a second dividing unit that divides a plurality of pixels constituting the second image into the plurality of hue-regions;

a second hue data determining unit that determines second hue-related data for each hue-region of the second image based on data of the second image; and a second non-hue data determining unit that determines second non-hue-related data for each hue-region of the second image based on data of the second image, wherein the correction data creating unit creates a set of hue correction data by using the first hue-related data and the second hue-related data for the plurality of hue-regions, and creates a plurality of sets of non-hue correction data corresponding to the plurality of hue-regions by using the first and second non-hue-related data for the plurality of hue-regions, wherein the correcting unit corrects hue-related data in each pixel of the second image based on the set of hue correction data, and corrects the non-hue-related data in each pixel of the second image based on a set of non-hue correction data of a hue-region, to which the hue-related data of the each pixel belongs.

4. The image processor according to claim 3, wherein the first hue-related data and the second hue-related data include H values that are represented in a HSV color space.

5. An image processor comprising:
a first receiving unit that receives a first image;
a second receiving unit that receives a second image;
a thumbnail generating unit that generates a thumbnail image based on the second image;
a first characteristic quantity data determining unit that determines a set of first characteristic quantity data based on the first image;
a second characteristic quantity data determining unit that determines a set of second characteristic quantity data based on one of the second image and the thumbnail image; and
a correcting unit that corrects the thumbnail image by using the set of first characteristic quantity data and the set of second characteristic quantity data;
a display unit that displays the corrected thumbnail image to prompt a user to input his/her instruction to correct the second image,
wherein upon receipt of the user's instruction, the correcting unit corrects the second image by using the set of first characteristic quantity data and the set of second characteristic quantity data.

6. The image processor according to claim 5, wherein the correcting unit corrects a part of the thumbnail image,
wherein the display unit displays the corrected thumbnail image in a manner distinguishing the corrected part of the thumbnail image from a remaining part of the thumbnail image.

7. The image processor according to claim 6, wherein the display unit adds, to the thumbnail image, a boarder line between the corrected part of the thumbnail image and the remaining part of the thumbnail image.

8. The image processor according to claim 7, wherein a color of the border line is determined based on a color in the corrected part of the thumbnail image.

9. The image processor according to claim 6, wherein the display unit transfers a color of the remaining part of the thumbnail image into an achromatic color.

10. The image processor according to claim 9, wherein the display unit reduces a gradation level in the remaining part of the thumbnail image.

11. The image processor according to claim 5, further comprising a correction data creating unit that creates correction data based on the set of first characteristic quantity data and the set of second characteristic quantity data.

12. The image processor according to claim 11,
wherein the first characteristic quantity data determining unit further comprises:
a first dividing unit that divides a plurality of pixels constituting the first image into a plurality of hue-regions;
a first hue data determining unit that determines first hue-related data for each hue-region of the first image based on data of the first image; and
a first non-hue data determining unit that determines first non-hue-related data for each hue-region of the first image based on the data of the first image,
wherein the second characteristic quantity data determining unit comprises:
a second dividing unit that divides a plurality of pixels constituting the second image into the plurality of hue-regions;
a second hue data determining unit that determines second hue-related data for each hue-region of the second image based on data of the second image; and
a second non-hue data determining unit that determines second non-hue-related data for each hue-region of the second image based on data of the second image,
wherein the correction data creating unit creates a set of hue correction data by using the first hue-related data and the second hue-related data for the plurality of hue-regions, and creates a plurality of sets of non-hue correction data corresponding to the plurality of hue-regions by using the first and second non-hue-related data for the plurality of hue-regions, and
wherein the correcting unit corrects hue-related data in each pixel of the second image based on the set of hue correction data, and corrects the non-hue-related data in each pixel of the second image based on a set of non-hue correction data of a hue-region, to which the hue-related data of the each pixel belongs.

13. The image processor according to claim 12, wherein the first hue-related data and the second hue-related data include H values that are represented in a HSV color space.

14. An image processor comprising:
a first characteristic quantity data storing unit that pre-stores at least one set of first characteristic quantity data, each of the at least one set of first characteristic quantity data being extracted from a specific image;
a receiving unit that receives data of an original image that is different from the specific image;
a determining unit that determines a set of second characteristic quantity data based on the data of the original image;
a generating unit that generates at least one set of display data indicative of at least one test image based on the at least one set of first characteristic quantity data;
a display unit that displays the at least one set of display data to prompt a user to specify one set of the at least one set of first characteristic quantity data; and
a correcting unit that corrects the original image by using the set of second characteristic quantity data and the one set of the at least one set of first characteristic quantity data specified by the user.

15. The image processor according to claim 14, further comprising an image storing unit that stores a test image,
wherein the generating unit includes a test image correcting unit that corrects the test image into at least one corrected test image by using the at least one set of first characteristic quantity data and a set of third characteristic quantity data concerning the test image, the generating unit generating the at least one corrected test image as the at least one set of display data.

16. The image processor according to claim 15, wherein the display unit displays both the test image and the at least one corrected test image.

17. The image processor according to claim 14, wherein the generating unit generates, as the at least one set of display data, at least one characteristic presenting image indicative of the at least one set of first characteristic quantity data.

18. The image processor according to claim 17, wherein the at least one set of first characteristic quantity data corresponds to at least one third image, each set of the at least one set of first characteristic quantity data includes:
first hue-related data for each of a plurality of hue-regions, into which a plurality of pixels constituting the corresponding third image are divided;
first non-hue-related data for each hue-region,
wherein the characteristic presenting image has a plurality of color regions, each of which corresponds to one of the plurality of hue regions,
wherein the generating unit determines a display color for each color region in the characteristic representing image based on the first hue-related data and the first non-hue-related data for the corresponding hue-region.

19. The image processor according to claim 18, wherein each set of the at least one set of first characteristic quantity data further includes a ratio value indicative of a ratio of an area of each hue-region relative to a total area of all the hue regions in the corresponding third image,
wherein the generating unit generates each characteristic representing image based on the corresponding set of first characteristic quantity data so that a ratio of an area of the display color for each color region in the characteristic presenting image relative to the entire area of the characteristic presenting image is proportional to the ratio value of the corresponding hue region.

20. The image processor according to claim 18, wherein the first non-hue-related data indicates at least one of brightness and saturation.

21. The image processor according to claim 18, wherein each set of the at least one set of first characteristic quantity data further includes a first ratio value indicative of a ratio of an area of each hue-region relative to a total area of all the hue regions in the third image,
wherein the set of second characteristic quantity data includes a second ratio value indicative of a ratio of an area of each hue-region relative to a total area of all the hue regions in the original image,
wherein when at least one of the first ratio in one set of first characteristic quantity data for one hue-region and the second ratio for one hue-region is smaller than a prescribed value, the generating unit generates the characteristic presenting image without using a display color corresponding to the hue region.

22. The image processor according to claim 14, further comprising a correction data creating unit that creates correction data based on the first and second characteristic quantity data.

23. The image processor according to claim 22, wherein each set of the at least one set of first characteristic quantity data includes:
first hue-related data for each of a plurality of hue-regions, into which a plurality of pixels constituting the third image are divided;
first non-hue-related data for each hue-region,
wherein the characteristic presenting image has a plurality of color regions each of which corresponds to one of the plurality of hue regions,
wherein the determining unit comprises:
a dividing unit that divides a plurality of pixels constituting the original image into the plurality of hue-regions;
a second hue data determining unit that determines second hue-related data for each hue-region of the original image based on the data of the original image; and
a second non-hue data determining unit that determines second non-hue-related data for each hue-region of the original image based on the data of the original image,
wherein the correction data creating unit creates a set of hue correction data by using the first hue-related data and the second hue-related data for the plurality of hue regions, and creates a plurality of sets of non-hue correction data corresponding to the plurality of hue-regions by using the first and second non-hue-related data for the plurality of hue-regions, and
wherein the correcting unit corrects hue-related data in each pixel of the original image based on the set of hue correction data, and corrects the non-hue-related data in each pixel of the original image based on a set of non-hue correction data for a hue-region in which the hue-related data of the each pixel belongs.

24. The image processor according to claim 23, wherein each of the first hue-related data and the second hue-related data includes an H value that is represented in a HSV color space.

25. The image processor according to claim 14, further comprising a printing process executing unit that executes a process for recording the corrected original image on a recording medium.

* * * * *